United States Patent
Schardt et al.

(10) Patent No.: US 10,831,975 B2
(45) Date of Patent: Nov. 10, 2020

(54) DEBUG BOUNDARIES IN A HARDWARE ACCELERATOR

(71) Applicant: International Business Machines Corporation, Armonk, NY (US)

(72) Inventors: Paul E. Schardt, Rochester, MN (US); Jim C. Chen, Rochester, MN (US); Lance G. Thompson, Rochester, MN (US); James E. Carey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/205,095

(22) Filed: Nov. 29, 2018

(65) Prior Publication Data

US 2020/0175131 A1 Jun. 4, 2020

(51) Int. Cl.
*G06F 30/398* (2020.01)
*G06F 13/16* (2006.01)
*G06F 30/30* (2020.01)

(52) U.S. Cl.
CPC ........ *G06F 30/398* (2020.01); *G06F 13/1668* (2013.01); *G06F 30/30* (2020.01)

(58) Field of Classification Search
CPC .. G06F 17/5081; G06F 17/50; G06F 17/5045; G06F 13/1668; G06F 13/16; G06F 16/24568; G06F 16/90344; G06F 11/3024; G06F 11/3409; G06F 9/4881; G06F 30/30; G06F 30/398; G06N 20/00; H03K 19/17752
See application file for complete search history.

(56) References Cited

U.S. PATENT DOCUMENTS

| 9,430,599 | B2 | 8/2016 | Mazzawi et al. |
| 9,990,212 | B2 | 6/2018 | Kruglick |
| 10,108,442 | B1 | 10/2018 | Camarda Silva Folco et al. |
| 10,459,773 | B2 | 10/2019 | Okada et al. |

(Continued)

OTHER PUBLICATIONS

Schardt et al., "Managing Cloud-Based Hardware Accelerators" U.S. Appl. No. 15/964,166, filed Apr. 27, 2018.

(Continued)

*Primary Examiner* — Vuthe Siek
(74) *Attorney, Agent, or Firm* — Martin & Associates, LLC; Derek P. Martin

(57) ABSTRACT

Multiple debug boundaries are defined in a hardware accelerator. The location of debug boundaries can be defined by a human user, or can be determined by automated tools based on characteristics of the circuitry in the hardware accelerator. Each debug boundary includes one or more hardware memory elements that are in a first state to indicate the debug boundary has not yet been reached, and that are changed to a second state by the hardware accelerator to indicate the debug boundary has been reached during execution of the hardware accelerator. Providing multiple debug boundaries in a hardware accelerator aids in debugging the accelerator design by identifying a particular section of the hardware accelerator where the failure occurred. This information regarding location of a failure may be provided to a user or to synthesis and simulation tools for the hardware accelerator design.

19 Claims, 20 Drawing Sheets

(56) References Cited

U.S. PATENT DOCUMENTS

| | | | | |
|---|---|---|---|---|
| 2011/0307233 | A1* | 12/2011 | Tseng | G06F 30/33 703/14 |
| 2015/0339130 | A1 | 11/2015 | Kruglick | |
| 2016/0210167 | A1 | 7/2016 | Bolic et al. | |
| 2017/0039132 | A1 | 2/2017 | Bates et al. | |
| 2018/0024861 | A1 | 1/2018 | Balle et al. | |
| 2018/0088174 | A1 | 3/2018 | Davis et al. | |
| 2018/0157531 | A1 | 6/2018 | Bobba et al. | |
| 2018/0196103 | A1 | 7/2018 | Champoux et al. | |
| 2018/0224502 | A1 | 8/2018 | Champoux | |
| 2018/0253368 | A1 | 9/2018 | Villareal et al. | |
| 2018/0336080 | A1 | 11/2018 | Jain et al. | |
| 2019/0065401 | A1 | 2/2019 | Dormitzer | |
| 2019/0068693 | A1 | 2/2019 | Bernat | |

OTHER PUBLICATIONS

Schardt et al., "Debug Boundaries for Hardware Accelerators" U.S. Appl. No. 16/025,162, filed Jul. 2, 2018.

IBM, Appendix P—List of IBM Patents or Patent Applications Treated as Related, dated Jan. 28, 2019.

Chen et al., "Enabling FPGAs in the Cloud", Proceedings of the 11th ACM Conference on Computing Frontiers, May 2014.

So et al., "A Unified Hardware/Software Runtime Environment for FPGA-Based Reconfigurable Computers using BORPH", ACM Transactions on Embedded Computing Systems, Feb. 2008.

Eguro et al., "FPGAS for Trusted Cloud Computing", Proceedings of the 22nd International Conference on Field Programmable Logic and Applications, Aug. 2012.

Fahmy et al., "Virtualized FPGA Accelerators for Efficient Cloud Computing", IEEE International Conference on Cloud Computing Technology and Science, Dec. 2015.

Intel Newsroom, "Intel FPGAs Power Acceleration-as-a-Service for Alibaba Cloud", Oct. 12, 2017.

Knodel et al., "RC3E: Provision and Management of Reconfigurable Hardware Accelerators in a Cloud Environment", 2nd International Workshop on FPGAs for Software Programmers, Sep. 1, 2015.

* cited by examiner

FIG. 10

Accelerator Catalog 1000

| Name | Location | LRU | MRU | Error Rate | Dependencies | Capabilities | Latency | Other Characteristic(s) |
|---|---|---|---|---|---|---|---|---|
| Acc1 | <path> | <time> | <time> | X/100 runs | Acc2 | FP Unit | 1.0 us | Includes NW connection |
| ... | ... | ... | ... | ... | ... | ... | ... | ... |
| AccN | <path> | <time> | <time> | Y/100 runs | None | Graphics | 500 ns | Affinity to Acc5 |

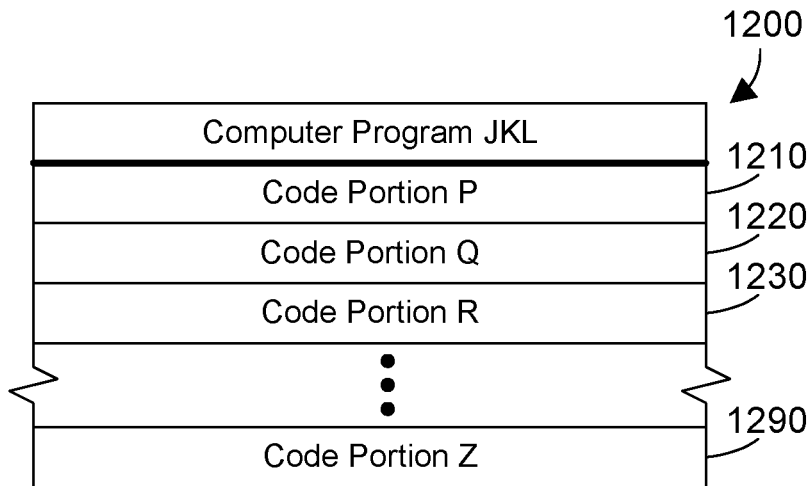
FIG. 12
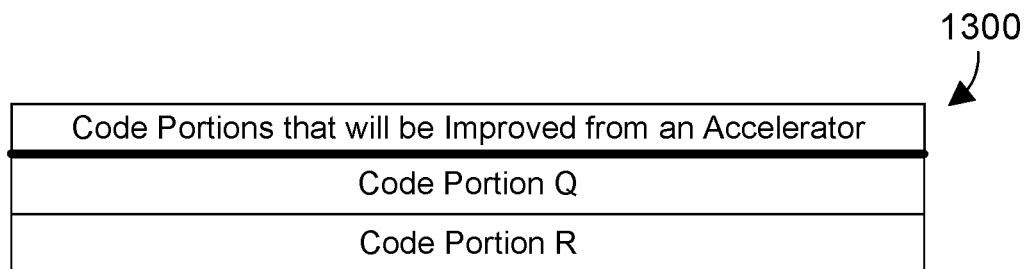
FIG. 13
| Accelerator Catalog | | | | | |
|---|---|---|---|---|---|
| Name | Location | LRU | MRU | Error Rate | Dependencies |
| AccQ | <path> | <time> | <time> | X/100 runs | None |
FIG. 14

US 10,831,975 B2

DEBUG BOUNDARIES IN A HARDWARE ACCELERATOR

BACKGROUND

1. Technical Field

This disclosure generally relates to computer systems, and more specifically relates to debugging hardware accelerators.

2. Background Art

The Open Coherent Accelerator Processor Interface (OpenCAPI) is a specification developed by a consortium of industry leaders. The OpenCAPI specification defines an interface that allows any processor to attach to coherent user-level accelerators and I/O devices. OpenCAPI provides a high bandwidth, low latency open interface design specification built to minimize the complexity of high-performance accelerator design. Capable of 25 gigabits (Gbits) per second per lane data rate, OpenCAPI outperforms the current peripheral component interconnect express (PCIe) specification which offers a maximum data transfer rate of 16 Gbits per second per lane. OpenCAPI provides a data-centric approach, putting the compute power closer to the data and removing inefficiencies in traditional system architectures to help eliminate system performance bottlenecks and improve system performance. A significant benefit of OpenCAPI is that virtual addresses for a processor can be shared and utilized in an OpenCAPI device, such as an accelerator, in the same manner as the processor. With the development of OpenCAPI, hardware accelerators may now be developed that include an OpenCAPI architected interface.

Debugging a hardware accelerator can be a difficult and time-consuming process. Many programmable devices include millions of gates or logic blocks, which makes any manual debugging of an accelerator design quite difficult.

BRIEF SUMMARY

Multiple debug boundaries are defined in a hardware accelerator. The location of debug boundaries can be defined by a human user, or can be determined by automated tools based on characteristics of the circuitry in the hardware accelerator. Each debug boundary includes one or more hardware memory elements that are in a first state to indicate the debug boundary has not yet been reached, and that are changed to a second state by the hardware accelerator to indicate the debug boundary has been reached during execution of the hardware accelerator. Providing multiple debug boundaries in a hardware accelerator aids in debugging the accelerator design by identifying a particular section of the hardware accelerator where the failure occurred. This information regarding location of a failure may be provided to a user or to synthesis and simulation tools for the hardware accelerator design.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 10 is a block diagram showing a sample accelerator catalog;

FIG. 12 is a block diagram showing a second sample computer program with different code portions;

FIG. 13 is a block diagram identifying two code portions in the computer program in FIG. 12 that would benefit from an accelerator;

FIG. 14 is a block diagram showing a sample accelerator catalog that includes an accelerator that corresponds to code portion Q;

DETAILED DESCRIPTION

Figure 1:
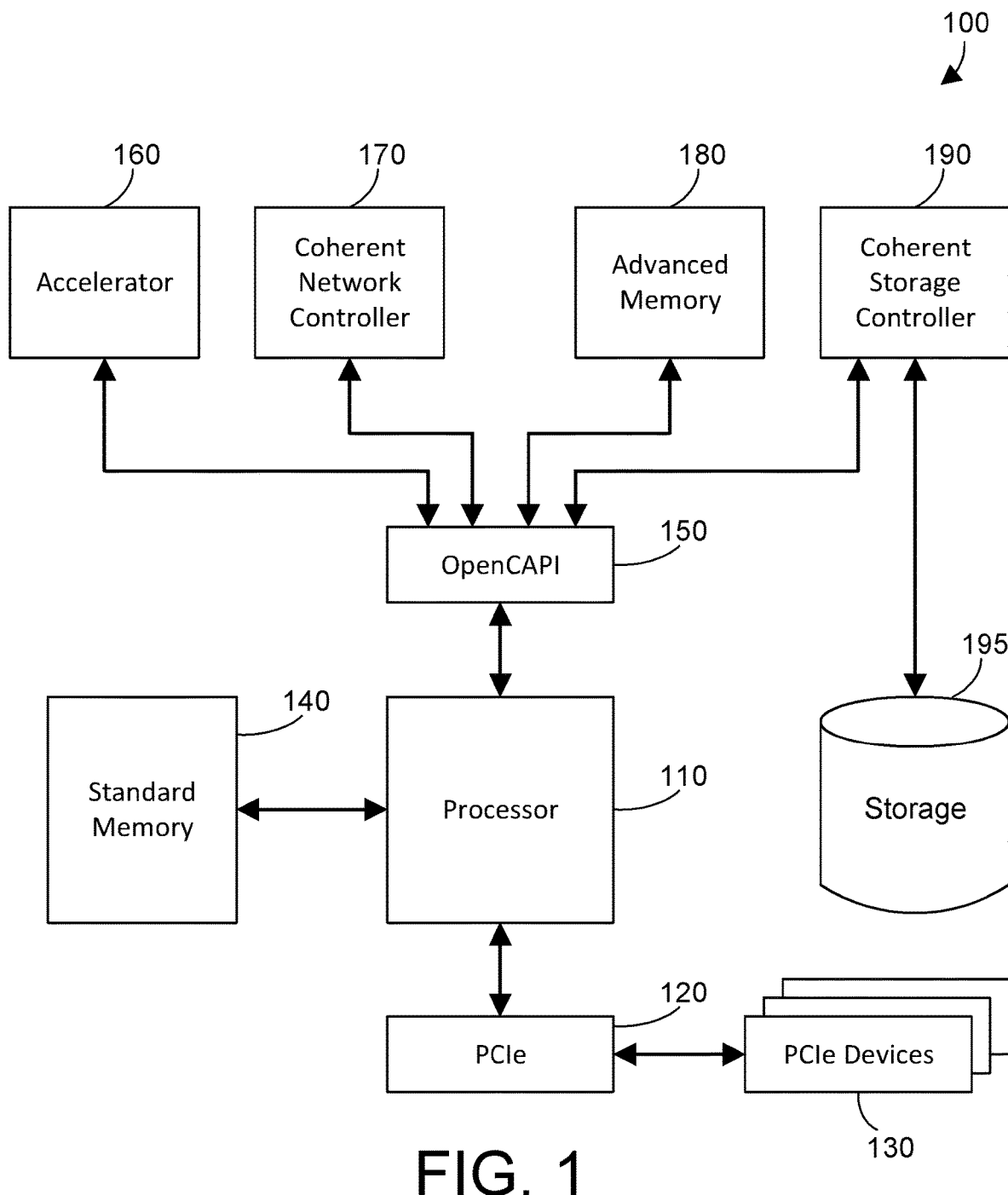
FIG. 1 is a block diagram of a sample system illustrating how an Open Coherent Accelerator Processor Interface (OpenCAPI) can be used.

As discussed in the Background Art section above, the Open Coherent Accelerator Processor Interface (OpenCAPI) is a specification that defines an interface that allows any processor to attach to coherent user-level accelerators and I/O devices. Referring to FIG. 1, a sample computer system 100 is shown to illustrate some of the concepts related to the OpenCAPI interface 150. A processor 110 is coupled to a standard memory 140 or memory hierarchy, as is known in the art. The processor is coupled via a PCIe interface 120 to one or more PCIe devices 130. The processor 110 is also coupled via an OpenCAPI interface 150 to one or more coherent devices, such as accelerator 160, coherent network controller 170, advanced memory 180, and coherent storage controller 190 that controls data stored in storage 195. While the OpenCAPI interface 150 is shown as a separate entity in FIG. 1 for purposes of illustration, instead of being a separate interface as shown in FIG. 1, the OpenCAPI interface 150 can be implemented within each of the coherent devices. Thus, accelerator 160 may have its own OpenCAPI interface, as may the other coherent devices 170, 180 and 190. One of the significant benefits of OpenCAPI is that virtual addresses for the processor 110 can be shared with coherent devices that are coupled to or include an OpenCAPI interface, permitting them to use the virtual addresses in the same manner as the processor 110.

Figure 2:
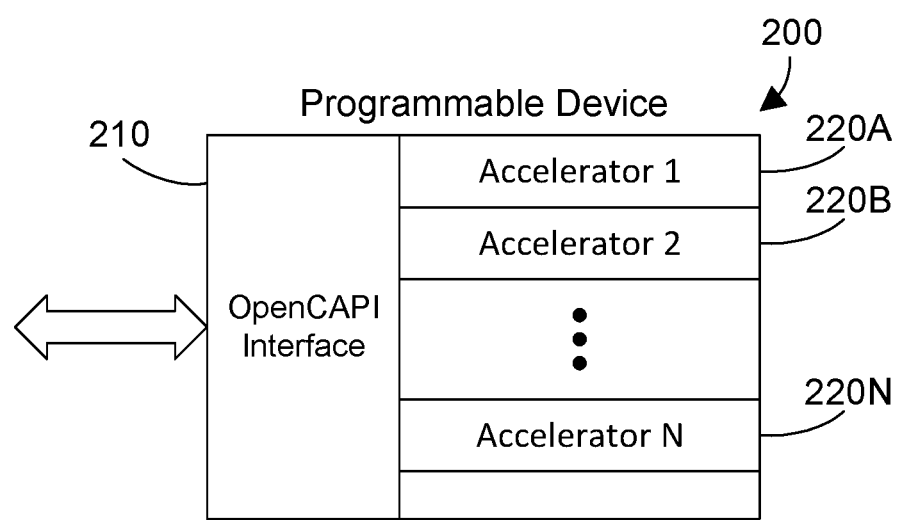
FIG. 2 is a flow diagram of a programmable device with an OpenCAPI interface that may include one or more hardware accelerators.

Referring to FIG. 2, a programmable device 200 represents any suitable programmable device. For example, the programmable device 200 could be an FPGA or an ASIC. An OpenCAPI interface 210 can be implemented within the programmable device. In addition, one or more accelerators can be implemented in the programmable device 200. FIG. 1 shows by way of example accelerator 1 220A, accelerator 2 220B, . . . , accelerator N 220N. In the prior art, a human designer would determine what type of accelerator is needed based on a function that needs to be accelerated by being implemented in hardware. The accelerator function could be represented, for example, in a hardware description language (HDL). Using known tools, the human designer can then generate an accelerator image that corresponds to the HDL. The accelerator image, once loaded into the programmable device such as 200 in FIG. 2, creates an accelerator in the programmable device that may be called as needed by one or more computer programs to provide the hardware accelerator(s).

Multiple debug boundaries are defined in a hardware accelerator. The location of debug boundaries can be defined by a human user, or can be determined by automated tools based on characteristics of the circuitry in the hardware accelerator. Each debug boundary includes one or more hardware memory elements that are in a first state to indicate the debug boundary has not yet been reached, and that are changed to a second state by the hardware accelerator to indicate the debug boundary has been reached during execution of the hardware accelerator. Providing multiple debug boundaries in a hardware accelerator aids in debugging the accelerator design by identifying a particular section of the hardware accelerator where the failure occurred. This information regarding location of a failure may be provided to a user or to synthesis and simulation tools for the hardware accelerator design.

Figure 3:
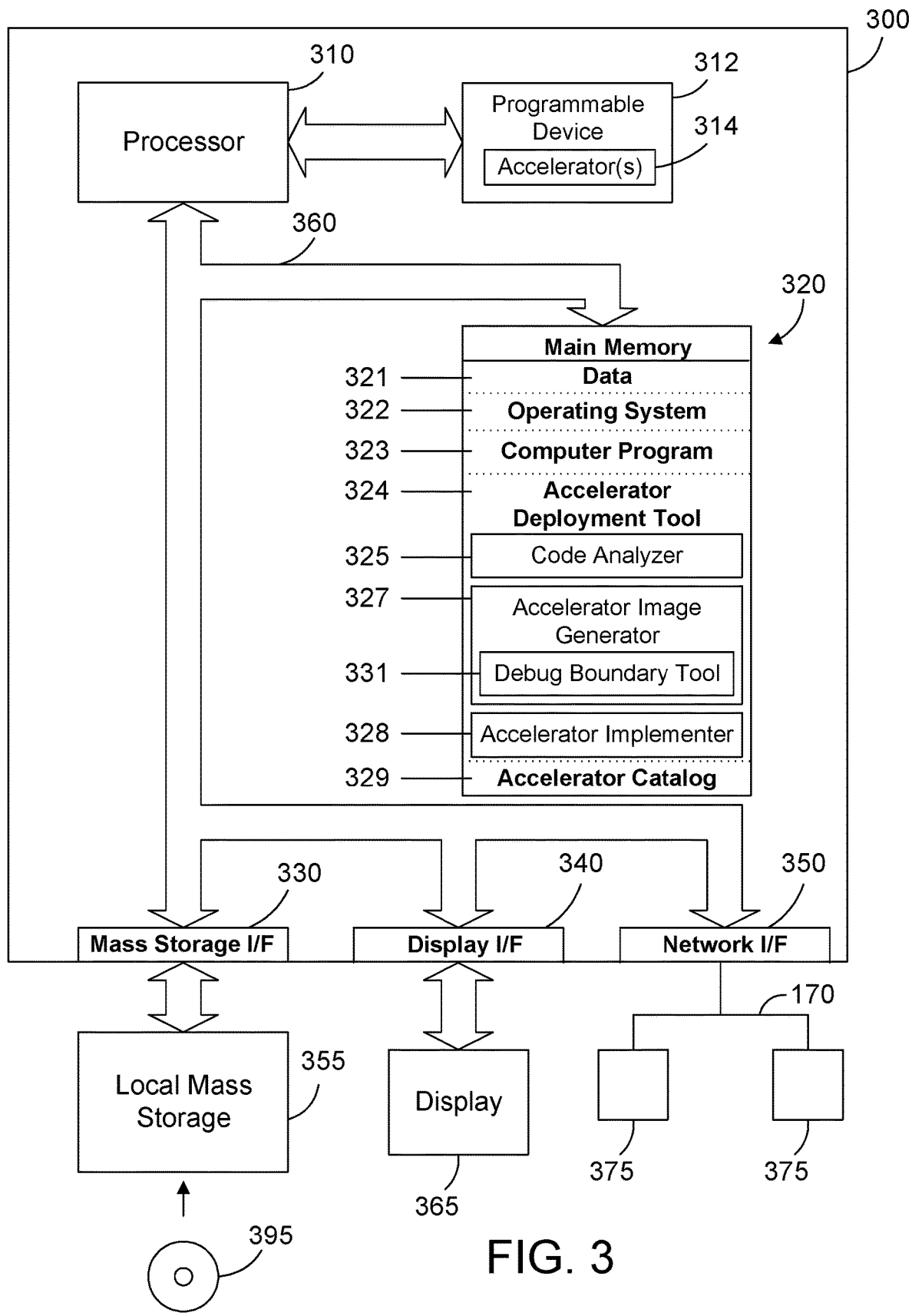
FIG. 3 is a block diagram of a computer system that includes a debug boundary tool.

Referring to FIG. 3, a computer system 300 is one suitable implementation of a computer system that includes a debug boundary tool as described in more detail below. Server computer system 300 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 3, computer system 300 comprises one or more processors 310, one or more programmable devices 312, a main memory 320, a mass storage interface 330, a display interface 340, and a network interface 350. These system components are interconnected through the use of a system bus 360. Mass storage interface 330 is used to connect mass storage devices, such as local mass storage device 355, to computer system 300. One specific type of local mass storage device 355 is a readable and writable CD-RW drive, which may store data to and read data from a CD-RW 395. Another suitable type of local mass storage device 355 is a card reader that receives a removable memory card, such as an SD card, and performs reads and writes to the removable memory. Yet another suitable type of local mass storage device 355 is universal serial bus (USB) that reads a storage device such a flash drive.

Main memory 320 preferably contains data 321, an operating system 322, a computer program 323, an accelerator deployment tool 324 and an accelerator catalog 329. Data 321 represents any data that serves as input to or output from any program in computer system 300. Operating system 322 is a multitasking operating system, such as AIX or LINUX. Computer program 323 represents any suitable computer program, including without limitations an application program, an operating system, firmware, a device driver, etc. The accelerator deployment tool 324 preferably includes a code analyzer 325, an accelerator image generator 327, and an accelerator implementer 328. The code analyzer 325 analyzes the computer program 324 as it runs to determine its run-time performance. One suitable way for code analyzer 325 to analyze the computer program is using known techniques for monitoring the run-time performance of a computer program. For example, tools exist in the art that allow real-time monitoring of the run-time performance of a computer program using a monitor external to the computer program that detects, for example, which addresses are being executed by the processor 310 during the execution of the computer program 323. Other tools known as profilers allow inserting instrumentation code into a computer program, which is code that increments different counters when different branches of the computer program are executed. The values of the counters can be analyzed to determine the frequency of executing each portion of the computer program. The code analyzer 325, after analyzing the run-time performance of the computer program, identifies a code portion, which is a portion of code in the computer program 323, that will be improved from being deployed to a hardware accelerator to enhance the run-time performance of the computer program 323.

The accelerator image generator 327 dynamically generates an accelerator image corresponding to the code portion in the computer program 323 identified by the code analyzer 325. The code portion in the computer program 323 is shown as code portion 326 in FIGS. 4 and 5. The accelerator image generator 327 may generate an accelerator image from the code portion using any suitable method. For example, the accelerator image generator 327 could generate an equivalent hardware description language (HDL) representation of the code portion, then synthesize the HDL representation into a suitable accelerator image for the programmable device 312. The accelerator implementer 328 preferably takes an accelerator image generated by the accelerator image generator 327, and uses the accelerator image to program the programmable device 312, thereby generating a hardware accelerator 314 in a programmable device 312 that corresponds to the code portion.

The accelerator image generator 327 preferably includes a debug boundary tool 331 that is used to define multiple debug boundaries in a hardware accelerator, and that can then determine and report a location of a failure in a hardware accelerator, thereby aiding in the debugging of the accelerator design. In the alternative, the debug boundary tool 331 could be separate from the accelerator image generator 327.

In a first implementation, the accelerator deployment tool 324 dynamically generates an accelerator image corresponding to the code portion of the computer program 323, then programs the programmable device with the accelerator image so the programmable device includes a hardware accelerator that corresponds to the code portion. In a second implementation, an accelerator catalog 329 is provided and maintained. The accelerator catalog 329 preferably includes a listing of previously-generated accelerators. In the second implementation, the accelerator deployment tool 324 first checks the accelerator catalog 329 to see if a previously-generated accelerator is available for the code portion. If so, the accelerator deployment tool 324 deploys a previously generated accelerator image identified in the accelerator catalog. If not, the accelerator deployment tool 324 dynamically generates an accelerator image as described above, then loads the image into a programmable device 312 to provide the accelerator 314 that corresponds to the code portion.

Computer system 300 utilizes well known virtual addressing mechanisms that allow the programs of computer system 300 to behave as if they only have access to a large, contiguous address space instead of access to multiple, smaller storage entities such as main memory 320 and local mass storage device 355. Therefore, while data 321, operating system 322, computer program 323, accelerator deployment tool 324 and accelerator catalog 329 are shown to reside in main memory 320, those skilled in the art will recognize that these items are not necessarily all completely contained in main memory 320 at the same time. It should also be noted that the term "memory" is used herein generically to refer to the entire virtual memory of computer system 300, and may include the virtual memory of other computer systems coupled to computer system 300.

Processor 310 may be constructed from one or more microprocessors and/or integrated circuits. Processor 310 could be, for example, one or more POWER9 microprocessors. Processor 310 executes program instructions stored in main memory 320. Main memory 320 stores programs and data that processor 310 may access. When computer system 300 starts up, processor 310 initially executes the program instructions that make up operating system 322. Processor 310 also executes the computer program 323, the accelerator deployment tool 324, and the debug boundary tool 331.

Programmable device(s) 312 can be any suitable programmable logic device that can be dynamically programmed by the processor 310. Examples of known suitable programmable logic devices include field-programmable gate arrays (FPGAs). However, the programmable device 312 broadly includes any programmable logic device that allows the processor 310 to dynamically program the programmable device 312, including known technologies as well as technologies that are developed in the future.

Although computer system 300 is shown to contain only a single processor and a single system bus, those skilled in the art will appreciate that a debug boundary tool as described herein may be practiced using a computer system that has multiple processors and/or multiple buses. In addition, the interfaces that are used preferably each include separate, fully programmed microprocessors that are used to off-load compute-intensive processing from processor 310. However, those skilled in the art will appreciate that these functions may be performed using I/O adapters as well.

Display interface 340 is used to directly connect one or more displays 365 to computer system 300. These displays 365, which may be non-intelligent (i.e., dumb) terminals or fully programmable workstations, are used to provide system administrators and users the ability to communicate with computer system 300. Note, however, that while display interface 340 is provided to support communication with one or more displays 365, computer system 300 does not necessarily require a display 365, because all needed interaction with users and other processes may occur via network interface 350.

Network interface 350 is used to connect computer system 300 to other computer systems or workstations 375 via network 370. Computer systems 375 represent computer systems that are connected to the computer system 300 via the network interface 350. Network interface 350 broadly represents any suitable way to interconnect electronic devices, regardless of whether the network 370 comprises present-day analog and/or digital techniques or via some networking mechanism of the future. Network interface 350 preferably includes a combination of hardware and software that allows communicating on the network 370. Software in the network interface 350 preferably includes a communication manager that manages communication with other computer systems 375 via network 370 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 350. In one suitable implementation, the network interface 350 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
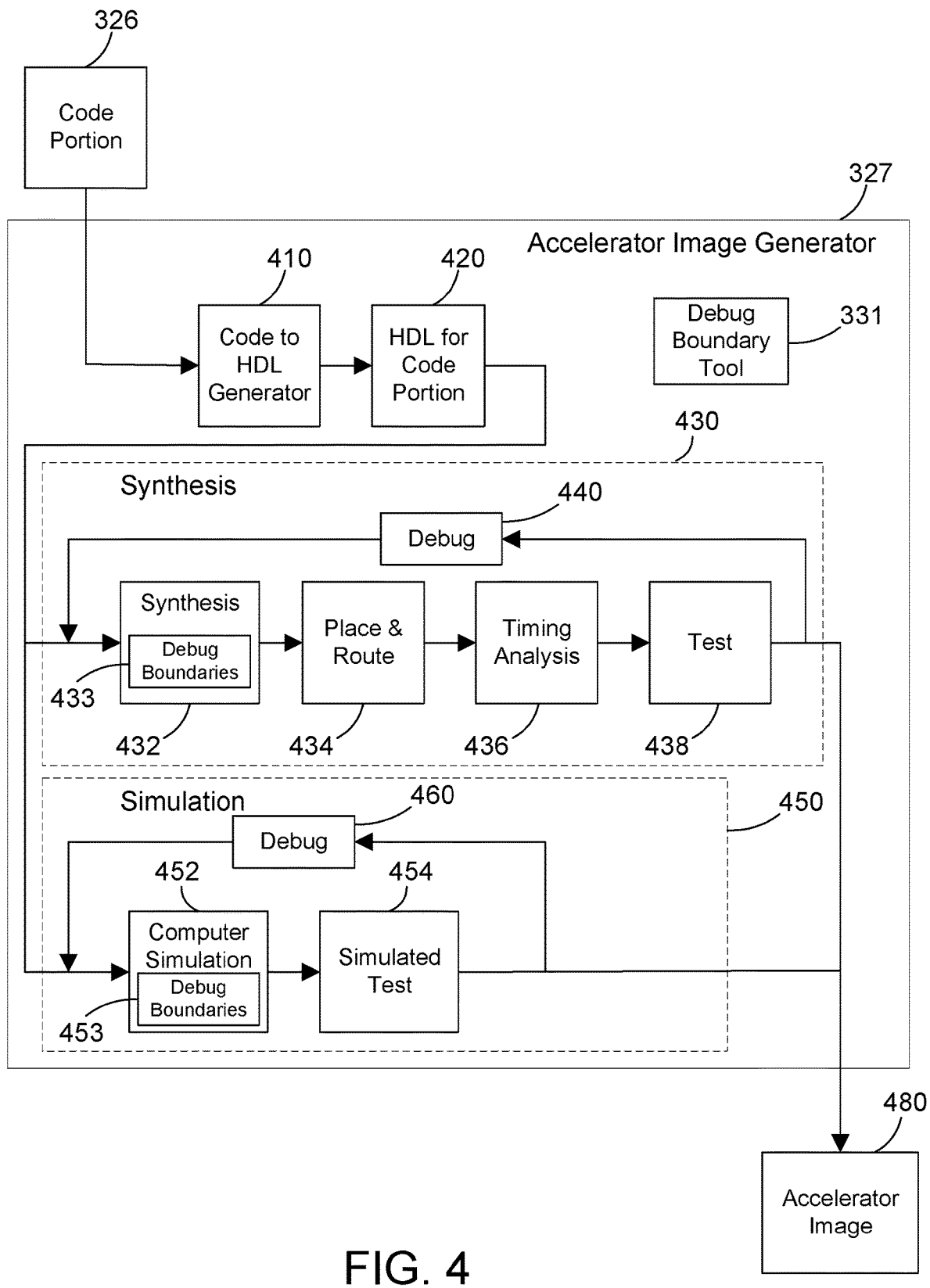
FIG. 4 is a flow diagram showing a specific implementation for how the accelerator image generator in FIG. 3 generates an accelerator image from a code portion.

FIG. 4 illustrates details of one suitable implementation of the accelerator image generator 327 shown in FIG. 3. As shown in both FIGS. 3 and 4, the accelerator image generator 327 in FIG. 3 preferably includes a debug boundary tool 331. The accelerator image generator 327 takes as input the code portion 326 shown in FIG. 4. A code to HDL generator 410 preferably converts the code portion 326 to a corresponding representation of the code portion in a hardware description language (HDL), shown in FIG. 4 as HDL for code portion 420. Known suitable hardware description languages include VHDL or Verilog, but any suitable hardware description language could be used. There are known software tools for generating an HDL representation of computer code. For example, Xilinx's Vivado High Level Synthesis is a software tool that converts code written in the C programming language to HDL. This type of tool is often referred to in the art as a "C to HDL" tool or a "C to RTL" tool, where RTL refers to the Register Transfer Level representation of a code portion needed to implement the code portion in hardware. The Code to HDL Generator 410 in FIG. 4 could be a known software tool, or could be a software tool specifically designed for the accelerator image generator 327.

The HDL for the code portion 420 is fed into one or more processes that may include both synthesis and simulation. The synthesis process 430 is shown in the middle portion of FIG. 4 in steps 432, 434, 436, 438 and 440. The simulation process 450 is shown in the lower portion of FIG. 4 in steps 452, 454 and 460. The HDL for code portion 420 may be fed into the synthesis block 432, which determines which hardware elements are needed. The place and route block 434 determines where on the programmable device to put the hardware elements, and how to route interconnections between those hardware elements. Timing analysis 436 analyzes the performance of the accelerator after the hardware elements have been placed and interconnections have been routed in block 434. Test block 438 runs tests on the resulting accelerator image to determine whether timing and performance parameters are satisfied. The test block 438 feeds back to debug block 440 when the design of the accelerator still needs improvement. This process may iterate several times.

The simulation process 450 takes in the HDL for the code portion 420, and performs a computer simulation to determine its functionality. A simulated test block 454 determines whether the simulated design functions as needed. The simulated test block 454 feeds back to a debug block 460 when the design of the accelerator still needs improvement.

The accelerator image generator 327 may include either the synthesis block 430, the simulation block 450, or both. In the most preferred implementation, the accelerator image generator 327 includes both the synthesis block 430 and the simulation block 450. The synthesis process can be very time-consuming. The simulation block is typically much faster in testing the design of the HDL than the synthesis block. When both synthesis 430 and simulation 450 are both present, the accelerator image generator can use both of these in any suitable way or combination. For example, the simulation block 450 could be used initially to iterate a few times on the design, and when the design is mostly complete, the mostly-completed design could be fed into the synthesis block 430. In another implementation, the synthesis and simulation blocks could function in parallel and cooperate until the generation of the accelerator image is complete. Regardless of the specific process used, the accelerator image generator 327 generates for the code portion 326 an accelerator image 480 that corresponds to the code portion 326. Once the accelerator image 480 has been generated, the accelerator implementer 328 in FIG. 3 can load the accelerator image 480 into a programmable device 312 to produce an accelerator 314 corresponding to the code portion 326. The accelerator 314 in the programmable device 312 may then be called by the computer program in place of the code portion 326.

Figure 5:
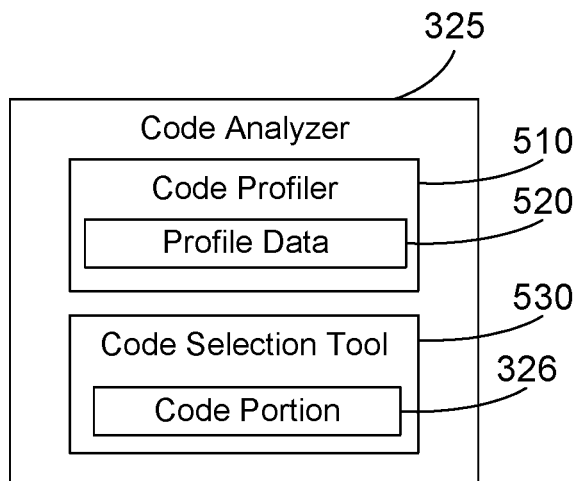
FIG. 5 is a block diagram of a specific implementation for the code analyzer in FIG. 3 that analyzes a computer program and selects a code portion.

Some details of one possible implementation for the code analyzer 325 in FIG. 3 are shown in FIG. 5. The code analyzer 325 can include a code profiler 510 that is used to profile the computer program. Profiling is done by the code profiler 510 preferably inserting instrumentation code into the computer program to generate profile data 520 as the computer program runs. The profile data 520 indicates many possible features of the computer program, including the frequency of executing different portions, the number or loop iterations, exceptions generated, data demand, bandwidth, time spent in a critical portion, etc. Software profilers are very well-known in the art, and are therefore not discussed in more detail here. For our purposes herein, suffice it to say the code profiler 510 generates profile data 520 that indicates run-time performance of the computer program being profiled.

The code analyzer 325 additionally includes a code selection tool 530 that identifies a code portion 326 that will be improved from being implemented in a hardware accelerator. Any suitable code portion could be identified according to any suitable criteria, algorithm or heuristic. For example, a portion of the code that performs floating-point calculations could be identified so that a corresponding floating-point accelerator could be generated to perform the floating-point calculations in the code. A portion of the code that performs a search of a database could be identified so a corresponding database search accelerator could be generated to replace the database search. A portion of the code that performs a specific function, such as data compression, XML parsing, packet snooping, financial risk calculations, etc., could also be identified. Of course, other code portions could be identified within the scope of the disclosure and claims herein. The code selection tool 530 can use any suitable criteria, algorithm or heuristic, whether currently known or developed in the future, to identify code portion 326. Once the code portion 326 in the computer program has been identified, a corresponding accelerator may be dynamically generated.

Figure 6:
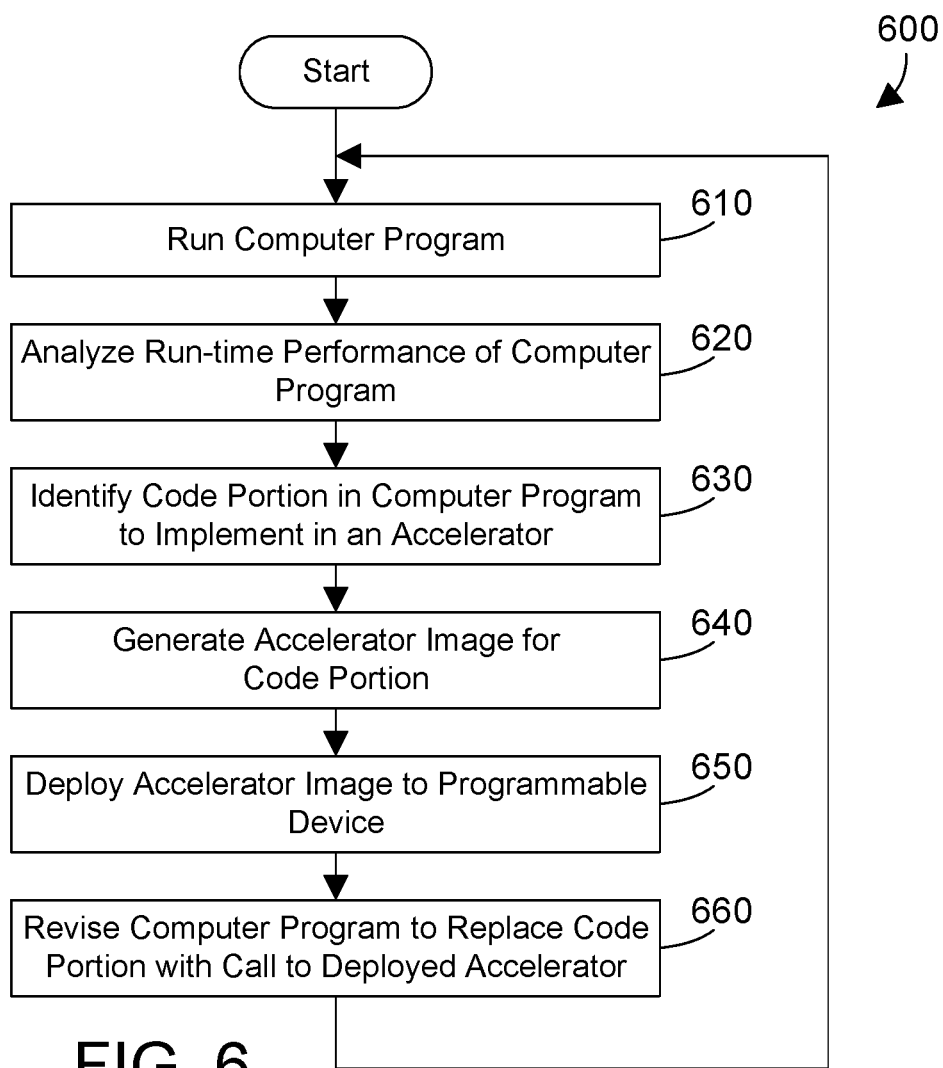
FIG. 6 is a flow diagram of a method for identifying a code portion in a computer program, dynamically generating and deploying an accelerator that corresponds to the code portion, then revising the computer program to replace the code portion with a call to the deployed accelerator.

Referring to FIG. 6, a method 600 starts by running the computer program (step 610). The run-time performance of the computer program is analyzed (step 620). This can be done, for example, by the code analyzer 325 shown in FIGS. 3 and 5 and discussed above. A code portion in the computer program is identified to implement in an accelerator (step 630). An accelerator image for the code portion is generated (step 640). The accelerator image is deployed to a programmable device (step 650). The computer program is then revised to replace the code portion with a call to the deployed accelerator (step 660). At this point, the deployed accelerator will perform the functions in hardware that were previously performed by the code portion, thereby improving the run-time performance of the computer program. Note that method 600 loops back to step 610 and continues, which means method 600 can iterate to continuously monitor the computer program and deploy accelerators, as needed, to improve performance of the computer program.

Figure 7:
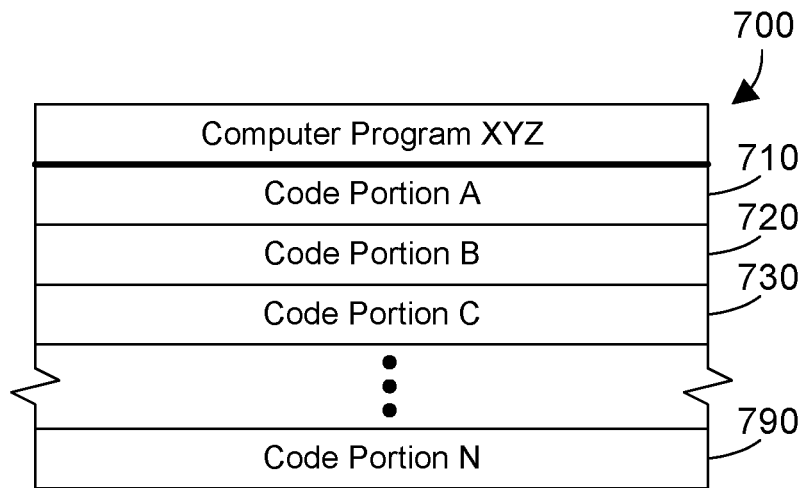
FIG. 7 is a block diagram showing a first sample computer program with different code portions.
Figure 8:
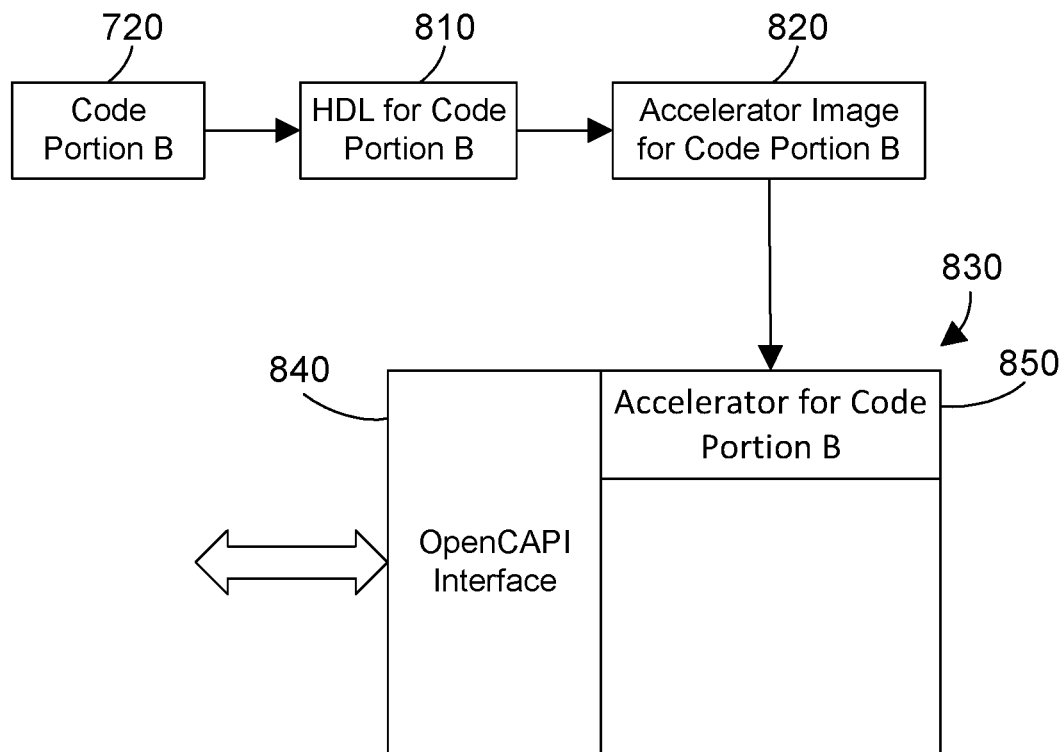
FIG. 8 is a block diagram showing how a code portion can be transformed to HDL, then to an accelerator image, which can be deployed to a programmable device to provide an accelerator.

Some examples are now provided to illustrate the concepts discussed above. FIG. 7 shows a sample computer program 700 that includes multiple code portions, shown in FIG. 7 as code portion A 710, code portion B 720, code portion C 730, . . . , code portion N 790. We assume code portion B 720 is identified as a code portion that will be improved from being implemented in a hardware accelerator. Code portion B 720 is then converted to a corresponding HDL representation 810, as shown in FIG. 8. The HDL for code portion B 810 is then used to generate an accelerator image for code portion B 820. This could be done, for example, using the method shown in FIG. 4, or using any other suitable method. Once the accelerator image for code portion B 820 has been generated, the accelerator image is loaded into a programmable device 830 to generate the accelerator for code portion B 850. Programmable device 830 is one suitable implementation for the programmable device 312 shown in FIG. 3, and preferably includes an OpenCAPI interface 840.

Figure 9:
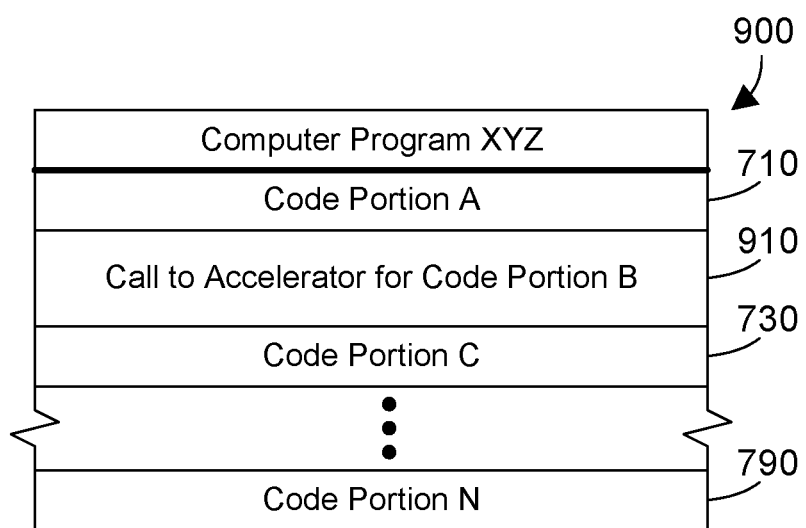
FIG. 9 is a block diagram showing the computer program in FIG. 7 after code portion B has been replaced with a call to the accelerator for code portion B.

Once the accelerator is deployed in the programmable device 830, the code portion B in the computer program is deleted and replaced by a call to the accelerator for code portion B 910 shown in FIG. 9. In the most preferred implementation, the accelerator for code portion B includes a return to the code that called it once the processing in the accelerator for code portion B is complete. In this manner the computer program 900, when it needs to execute what was previously code portion B, will make a call to the accelerator for code portion B, which will perform the needed functions in hardware, then return to the computer program. In this manner a suitable accelerator may be automatically generated for an identified code portion to increase the run-time performance of the computer program.

In a first implementation, an accelerator may be dynamically generated to improve the performance of a computer program, as shown in FIGS. 4-9 and described above. In a second implementation, once an accelerator is dynamically generated, it can be stored in a catalog so it may be reused when needed. FIG. 10 shows a sample accelerator catalog 1000, which is one suitable implementation for the accelerator catalog 329 shown in FIG. 3. An accelerator catalog may include any suitable data or information that may be needed for an accelerator or the corresponding code portion. For the specific example shown in FIG. 10, accelerator catalog includes each of the following fields: Name, Location, Least Recently Used (LRU), Most Recently Used (MRU), Dependencies, Capabilities, Latency, and Other Characteristics. The Name field preferably includes a name for the accelerator. The name field may also include a name for a code portion that corresponds to the accelerator. The location field preferably specifies a path that identifies the location for the accelerator image. While the accelerator image could be stored in the catalog 1000, in the most preferred implementation the catalog 1000 instead includes a path to storage external to the accelerator catalog 1000 where the accelerator image is stored. The least recently used (LRU) field could include the time when the accelerator was used the first time. In the alternative, the LRU field could include a flag that is set when the accelerator is the least recently used of all the accelerators in the catalog. The most recently used (MRU) field could include the time when the accelerator was last used. In the alternative, the MRU field could include a flag that is set when the accelerator is the most recently used of all the accelerators in the catalog. The error rate field provides a suitable error rate for the accelerator, and can be expressed in any suitable way. For the example in FIG. 10, the error rate is expressed as a number X of errors per 100 runs of the accelerator. The error rate field could include any suitable error information that could be, for example, dynamically monitored so an increase in the error rate could result in a notification to take corrective action. The dependencies field may indicate any dependencies the accelerator may have. For example, the dependencies field could specify the specific programmable device the accelerator was designed for. The dependencies field could also specify any dependencies on other accelerators. Thus, accelerator Acc1 in FIG. 10 has a dependency on Acc2, which means Acc1 needs Acc2 to also be implemented. The capabilities field can provide any suitable indication of the capabilities of the accelerator. In the two entries shown in FIG. 10, the capabilities are shown as floating point (FP) Unit for Acc1 and Graphics for AccN. Note, however, the capabilities can be indicated in any suitable way. For example, the capabilities could include a specification of the code portion for which the accelerator was implemented. A separate index could be maintained that correlates each code portion to its corresponding accelerator, along with a descriptor or other data that describes attributes of the code portion. The capabilities field could include any suitable information, such as a pointer to the index, so the code portion corresponding to the accelerator could be easily identified.

The latency field preferably specifies average latency for the accelerator. For the example shown in FIG. 10, Acc1 has a latency of 1.0 microseconds while accelerator AccN has a latency of 500 nanoseconds. Latency could represent, for example, the time required for the accelerator to perform its intended function. The other characteristics field can include any other suitable information or data that describes or otherwise identifies the accelerator, its characteristics and attributes, and the code portion corresponding to the accelerator. For the two sample entries in FIG. 10, the other characteristics field indicates Acc1 includes a network connection, and AccN has an affinity to Acc5, which means AccN should be placed in close proximity to Acc5 on the programmable device, if possible. The various fields in FIG. 10 are shown by way of example, and it is within the scope of the disclosure and claims herein to provide an accelerator catalog with any suitable information or data.

Figure 11:
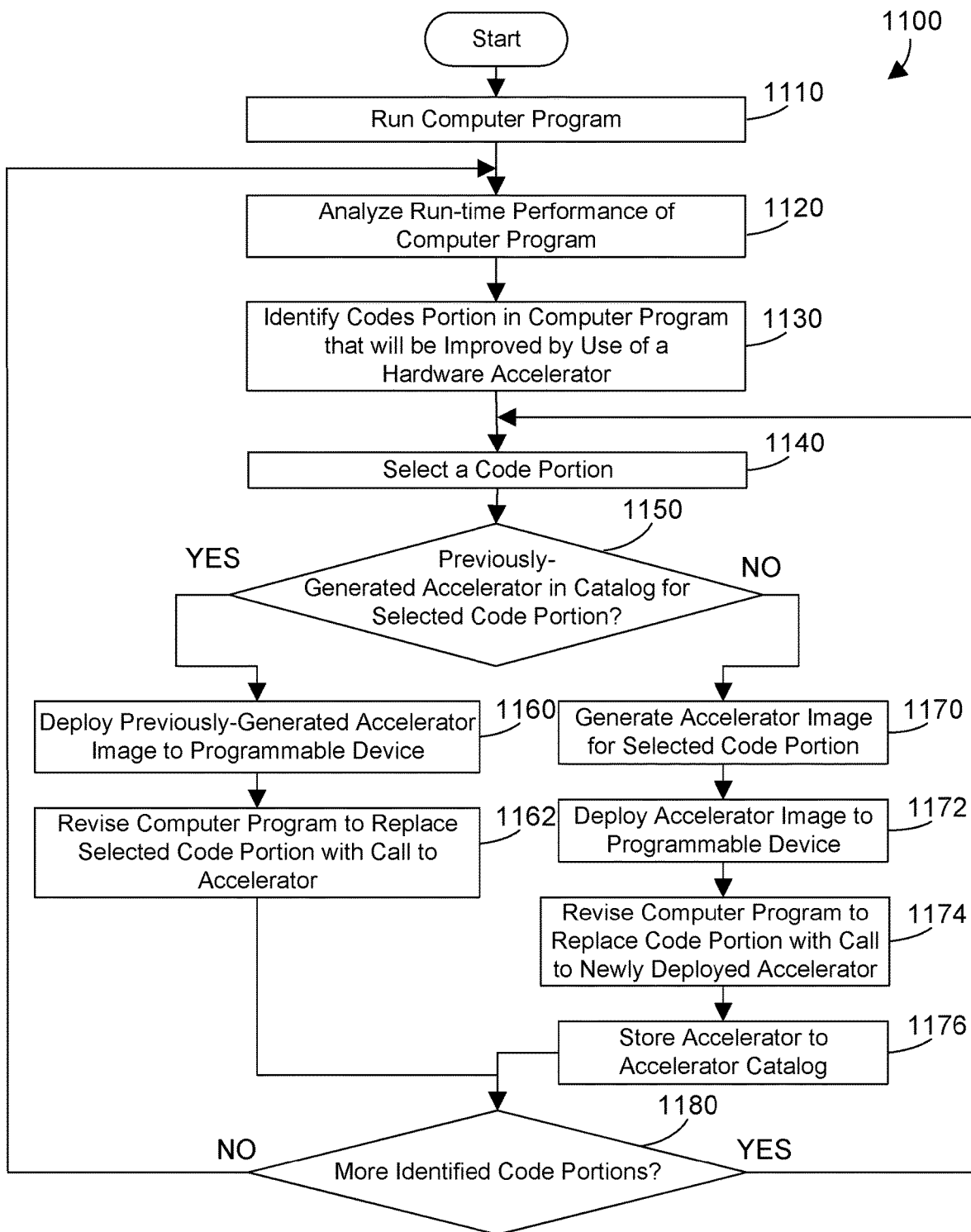
FIG. 11 is a flow diagram of a method for deploying an accelerator for a code portion when a catalog of previously-generated accelerators is maintained.

Referring to FIG. 11, a method 1100 in accordance with the second implementation begins by running the computer program (step 1110). The run-time performance of the computer program is analyzed (step 1120). One or more code portions in the computer program that will be improved by use of a hardware accelerator are identified (step 1130). One of the identified code portions is selected (step 1140). When there is a previously-generated accelerator in the accelerator catalog for the selected code portion (step 1150=YES), the previously-generated accelerator image is deployed to the programmable device (step 1160) to provide the accelerator. The computer program is then revised to replace the selected code portion with a call to the accelerator (step 1162). When there is no previously-generated accelerator in the catalog for the selected code portion (step 1150=NO), an accelerator image for the selected code portion is dynamically generated (step 1170), the accelerator image is deployed to a programmable device (step 1172), the computer program is revised to replace the code portion with a call to the newly deployed accelerator (step 1174), and the accelerator is stored to the accelerator catalog (step 1176). When the accelerator image is stored within the catalog entry, step 1176 write the accelerator image to the catalog. When the accelerator image is stored in storage external to the catalog, step 1176 stores the accelerator image to the external storage and writes an entry to the accelerator catalog that includes a path to the accelerator image in the external storage.

When there are more identified code portions (step 1180=YES), method 1100 loops back to step 1140 and continues. When there are no more identified code portions (step 1180=NO), method 1100 loops back to step 1120 and continues. This means method 1100 most preferably continuously monitors the computer program and dynamically generates and/or deploys accelerators as needed to improve the run-time performance of the computer program.

Figure 15:
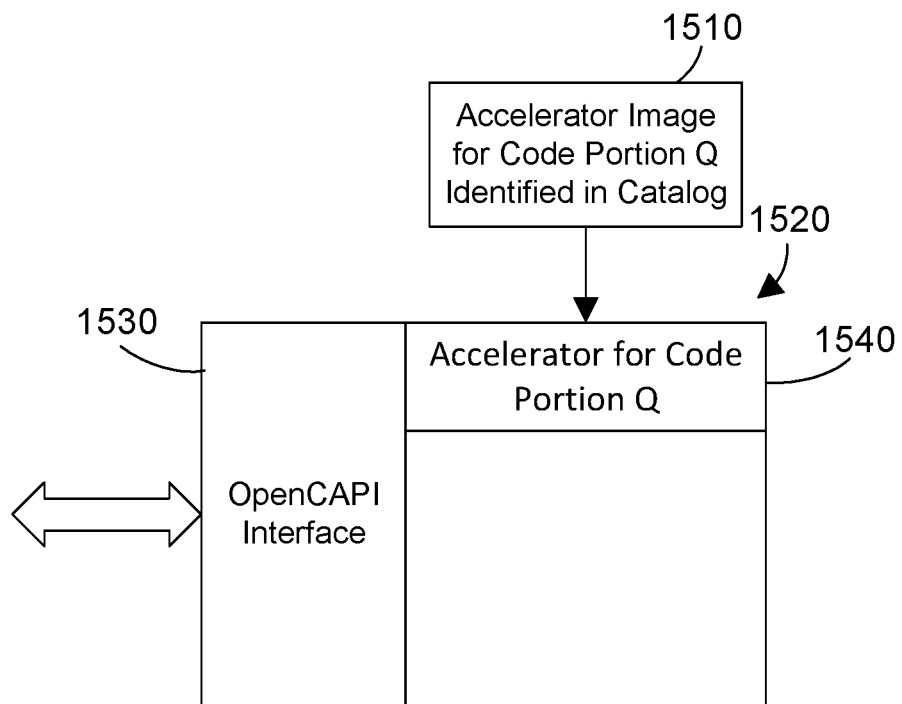
FIG. 15 is a block diagram showing the deployment of an accelerator image for code portion Q identified in the catalog in FIG. 14 to a programmable device.

An example is now provided to illustrate the concepts in FIG. 11 that relate to the second preferred implementation. FIG. 12 shows a sample computer program 1200 that includes many code portions, represented in FIG. 12 as code portion P 1210, code portion Q 1220, code portion R 1230, . . . , code portion Z 1290. We assume steps 1110, 1120 and 1130 in FIG. 11 are performed. In step 1130, we assume code portion Q 1220 and code portion R 1230 are identified as code portions that will be improved by implementing these code portions in an accelerator, as shown in table 1300 in FIG. 13. We further assume we have an accelerator catalog 1400 that is one suitable implementation for the accelerator catalog 329 shown in FIG. 3. Accelerator catalog 1400 has a single entry for AccQ, which we assume is an accelerator for code portion Q 1220 that was generated previously. Because the accelerator for code portion Q was previously-generated, the corresponding accelerator image can be used without having to generate the accelerator image anew. We assume code portion Q 1220 is selected in step 1140. There is a previously-generated accelerator in the catalog for code portion Q (step 1150=YES), so the previously-generated accelerator image corresponding to code portion Q 1510 is deployed to the programmable device (step 1160), as shown in FIG. 15. Deploying the accelerator image for code portion Q 1510 identified in the catalog to the programmable device 1520 results in implementing the accelerator for code portion Q 1540 in the programmable device 1520. The accelerator for code portion Q 1540 may then be called by the computer program to perform the functions of previous code portion Q in hardware, thereby increasing the run-time performance of the computer program. The programmable device 1520 is one suitable example of a programmable device 312 shown in FIG. 3, and preferably includes an OpenCAPI interface 1530.

Figure 16:
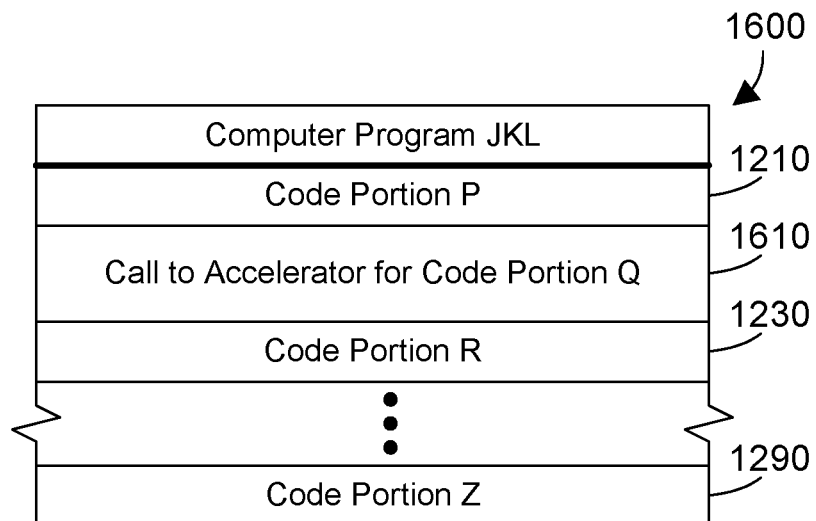
FIG. 16 is a block diagram showing the computer program in FIG. 12 after code portion Q has been replaced with a call to the accelerator for code portion Q.

The computer program is then revised to replace the selected code portion Q 1220 with a call to the accelerator for code portion Q (step 1162). FIG. 16 shows the computer program 1200 in FIG. 12 after the code portion Q has been replaced with the call to the accelerator for code portion Q, as shown at 1610 in FIG. 16. Thus, computer program 1600, instead of executing code portion Q, instead invokes the accelerator for code portion Q 1540 in the programmable device 1520 to increase the run-time performance of the computer program.

Figure 17:
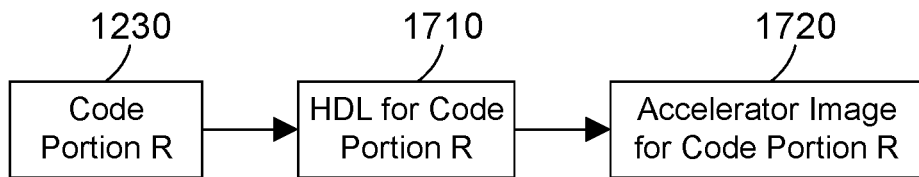
FIG. 17 is a block diagram showing generation of an accelerator image from code portion R in the computer program shown in FIGS. 12 and 16.
Figure 18:
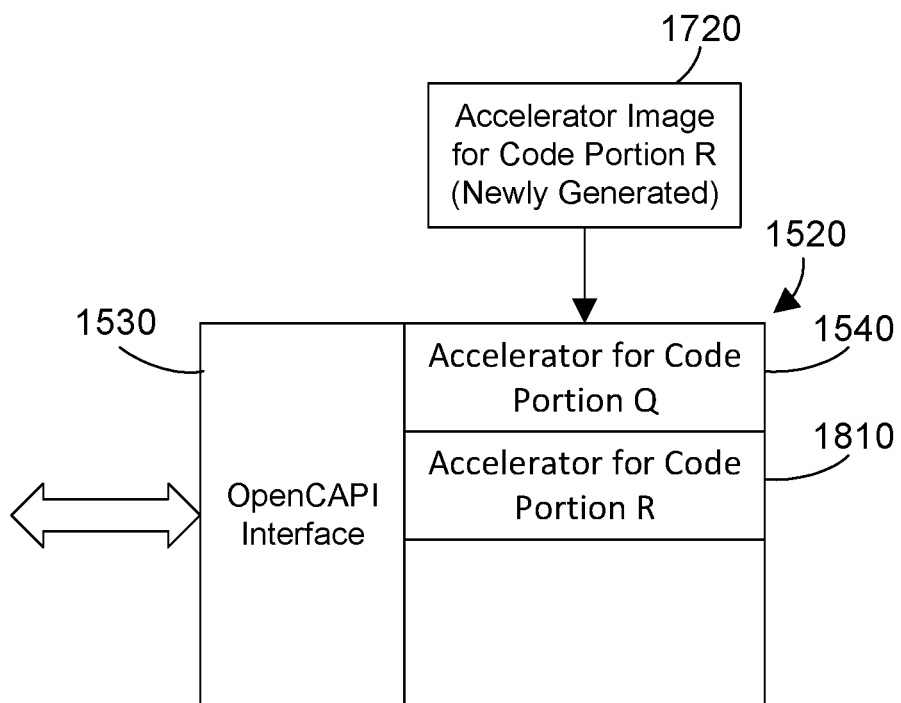
FIG. 18 is a block diagram showing the deployment of a newly-generated accelerator image for code portion R to a programmable device.
Figures 19, 20:
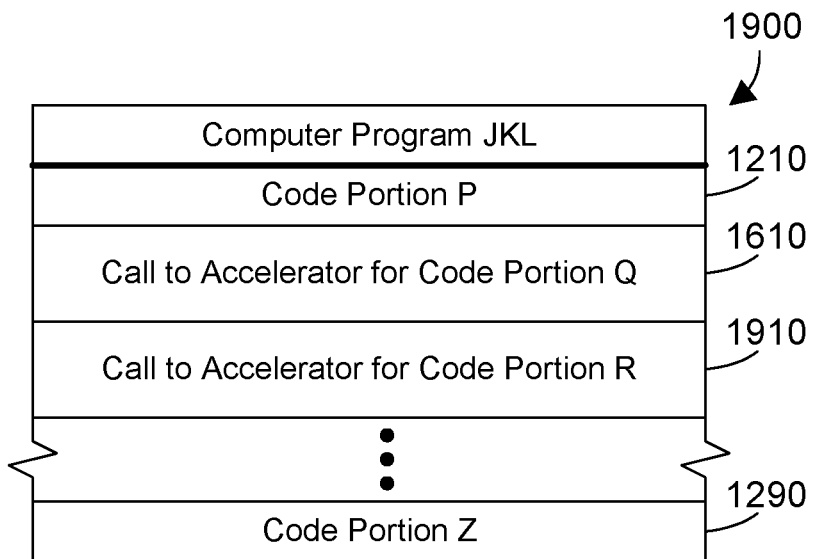
FIG. 19 is a is a block diagram showing the computer program in FIG. 16 after code portion R has been replaced with a call to the accelerator for code portion R.
FIG. 20 is a block diagram of the accelerator catalog 1400 shown in FIG. 14 after an entry is created representing the accelerator for code portion R.

There is still an identified code portion (step 1180=YES), namely code portion R shown in FIG. 13, so method 11 in FIG. 11 loops back to step 1140, where code portion R 1230 is selected (step 1140). There is no previously-generated accelerator in the catalog 1400 shown in FIG. 14 for code portion R (step 1150=NO), so an accelerator image is dynamically generated for code portion R (step 1170). This is represented in FIG. 17, where the code portion R 1230 is used to generate HDL for code portion R 1710, which is used to generate the accelerator image for code portion R 1720. The accelerator image for code portion R 1720, which was newly dynamically generated, is then deployed to the programmable device (step 1172). This is shown in FIG. 18, where the programmable device 1520 that already includes accelerator for code portion Q 1540 is loaded with the accelerator image for code portion R 1720 to generate the accelerator for code portion R 1810. The computer program is then revised to replace code portion R with the call to the accelerator for code portion R (step 1174), as shown at 1910 in FIG. 19. The accelerator for code portion R is also stored in the accelerator catalog (step 1176), resulting in the accelerator catalog 1400 containing entries AccQ and AccR corresponding to two accelerators, as shown in FIG. 20.

Figure 21:
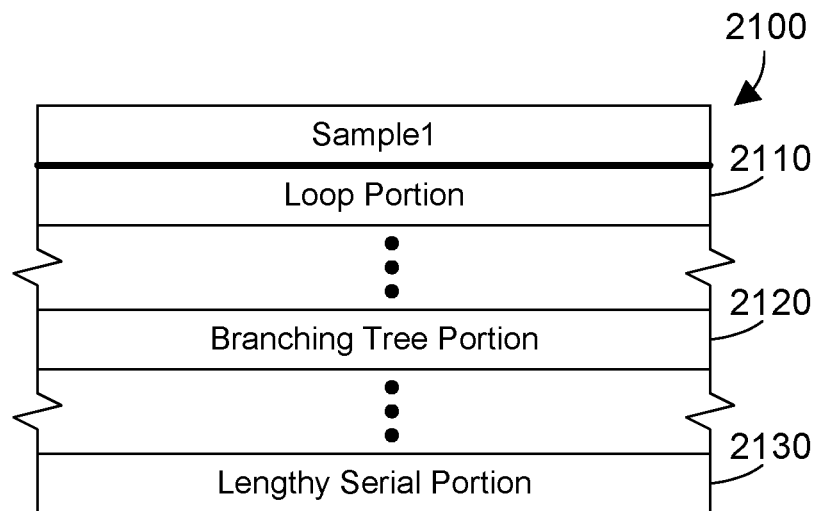
FIG. 21 is a block diagram of a sample computer program.
Figure 22:
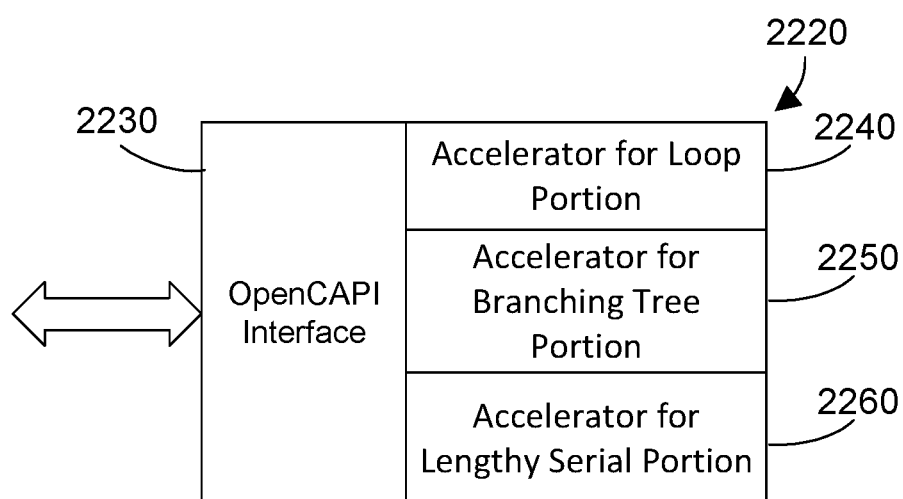
FIG. 22 is a block diagram of a programmable device that has an OpenCAPI interface and includes an accelerator for the loop portion in FIG. 21, an accelerator for branching tree portion in FIG. 21, and an accelerator for lengthy serial portion in FIG. 21.

A more specific example is shown in FIGS. 21 and 22. For this example we assume a computer program called Sample1 2100 includes three different code portions of interest, namely a loop portion 2110, a branching tree portion 2120, and a lengthy serial portion 2130. Loop portion 2110 is representative of a code portion that is a loop that can be unrolled because each iteration is largely independent from other iterations. Due to the independence of each iteration, the loop can be unrolled, and the loop function can be deployed to an accelerator so each iteration will run in parallel in hardware. Financial risk calculations sometimes include code portions such as loop portion 2110. Running different iterations of the loop in parallel in a hardware accelerator increases the run-time performance of the Sample1 computer program.

Computer program Sample1 2100 also includes a branching tree portion 2120. We assume for this example branching tree portion 2120 operates on one or more relatively deep branching trees. In this case, the branching tree portion 2120 can be deployed to an accelerator so each branch of the branching tree will run in parallel in hardware, the branch selection criteria will be calculated, and at the final stage of the logic, the result will be selected from the selected branch. Running different branches of the branching tree in parallel in a hardware accelerator increases the run-time performance of the Sample1 computer program.

Computer program Sample1 2100 also includes a lengthy serial portion 2130. We assume for this example the lengthy serial portion 2130 can be shortened by leveraging unique hardware capabilities in an accelerator. Some math functions, for example, could by lengthy serial portions that could be implemented in an accelerator. Running a lengthy serial portion in hardware increases the run-time performance of the Sample1 computer program.

We assume the code portions in FIG. 21 are identified according to profile data 520 generated by the code profiler 510 in FIG. 5. The criteria used by the code selection tool 530 to select the code portions 2110, 2120 and 2130, which are examples of code portion 326 in FIGS. 4 and 5, may be any suitable criteria. The three example code portions 2110, 2120 and 2130 in FIG. 21 as described above indicate suitable criteria that could be used by the code selection tool 530 to select code portions 2110, 2120 and 2130 to be implemented in one or more accelerators. Of course, the claims and disclosure herein expressly extend to any suitable criteria for the code selection tool 530 to select one or more code portions to be implemented in one or more accelerators.

FIG. 22 shows a programmable device 2220 that has an OpenCAPI interface 2230 and includes an accelerator for loop portion 2240, an accelerator for branching tree portion 2250, and an accelerator for lengthy serial portion 2260. While these three accelerators are shown to be implemented in the same programmable device 2220 in FIG. 22, one skilled in the art will recognize these could be implemented in separate programmable devices as well.

Figure 23:
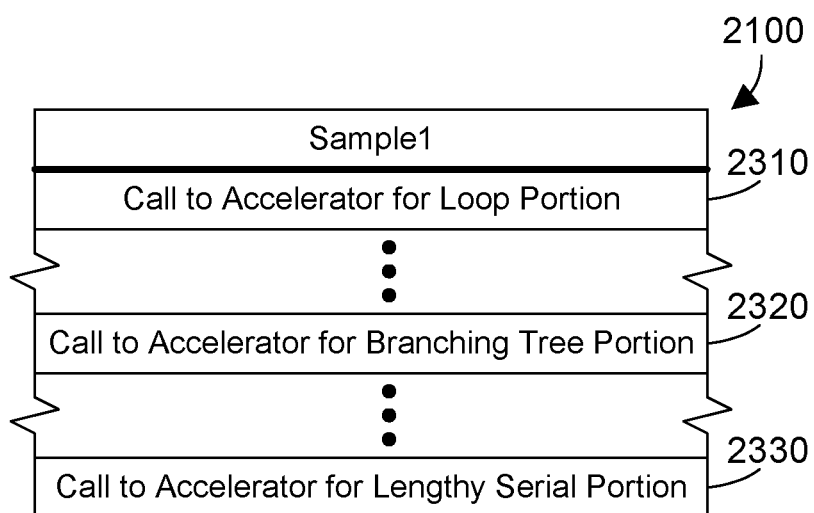
FIG. 23 is a block diagram of the computer program in FIG. 21 after the code portions have been replaced with calls to corresponding accelerators.

FIG. 23 shows the computer program Sample1 2100 after the code portions shown in FIG. 21 are replaced with calls to the hardware accelerators shown in FIG. 22. Thus, loop portion 2110 in FIG. 21 has been replaced by a call to the accelerator for loop portion 2310; the branching tree portion 2320 in FIG. 21 has been replaced by a call to the accelerator for the branching tree portion 2320; and the lengthy serial portion 2130 in FIG. 21 has been replaced by a call to the accelerator for the lengthy serial portion 2330. Because the Sample1 computer program 2100 in FIG. 23 now includes calls to hardware accelerators, the run-time performance of the computer program 2100 is increased.

Figure 24:
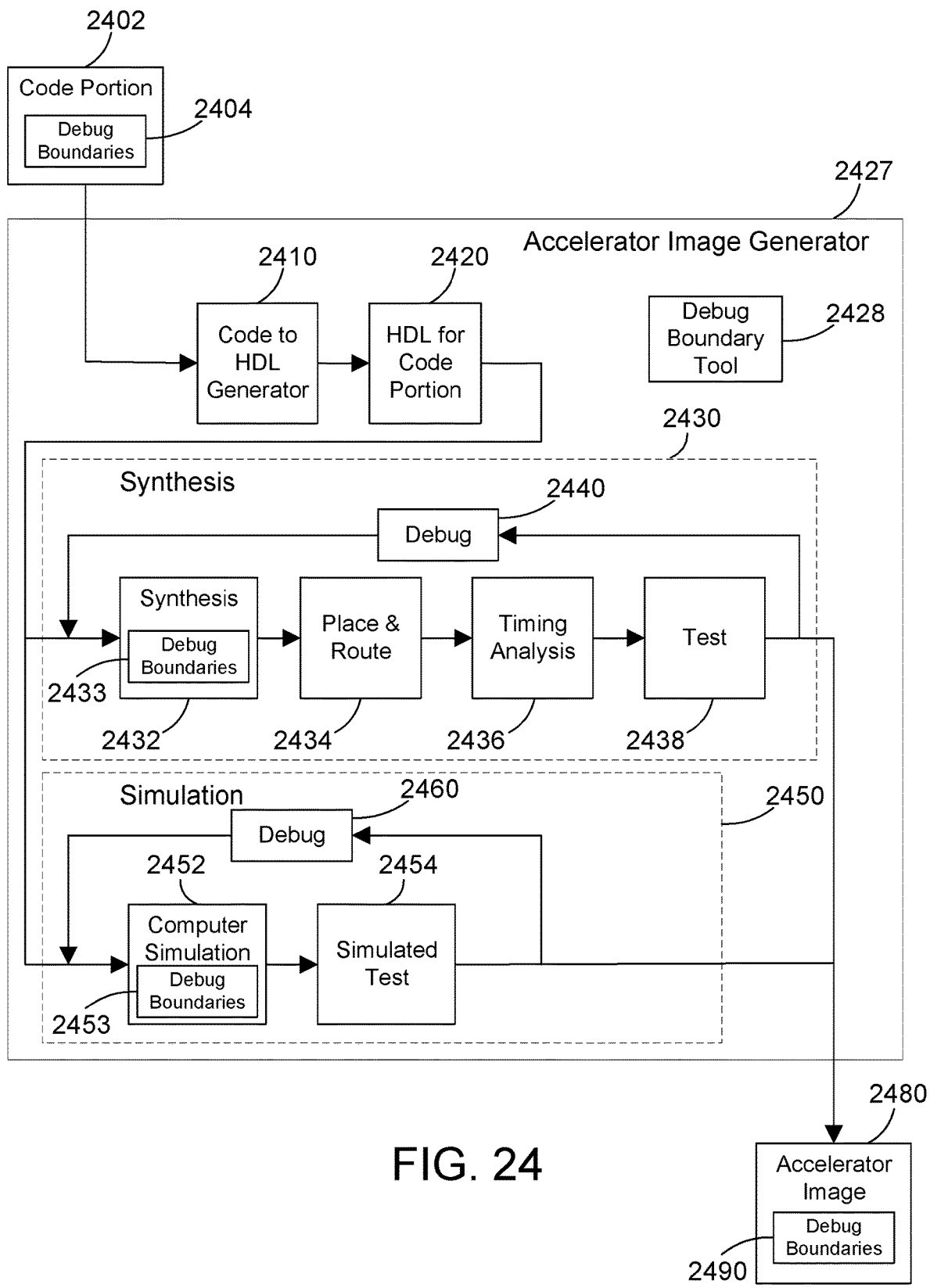
FIG. 24 is a flow diagram showing a specific implementation for an accelerator image generator that generates an accelerator image from a code portion, where the code portion may include one or more defined debug boundaries, or where one or more debug boundaries are dynamically determined and inserted into the accelerator design.

Referring to FIG. 24, an accelerator image generator 2427 is a variation of the accelerator image generator 327 in FIGS. 3 and 4 to illustrate defining multiple debug boundaries in a hardware accelerator design. The accelerator image generator 2427 preferably includes a debug boundary tool 2428, which can be used to define multiple debug boundaries in a hardware accelerator. In a first implementation, a human user can define debug boundaries 2404 in the code portion 2402. These debug boundaries 2404 are then processed to generate debug boundaries 2433 in the synthesis block 2432, and/or to provide debug boundaries 2453 in the computer simulation block 2452. The resulting accelerator image 2480 generated by the accelerator image generator 2427 includes debug boundaries 2490 in the accelerator image, which will result in corresponding debug boundaries in a hardware accelerator when the accelerator image is deployed to a programmable device. The function of the other blocks in FIG. 24 not specifically addressed above, namely, 2410, 2420, 2430, 2434, 2436, 2438, 2440, 2450, 2454, and 2460, is preferably similar to the function of corresponding blocks of the same name in FIG. 3.

Figure 25:
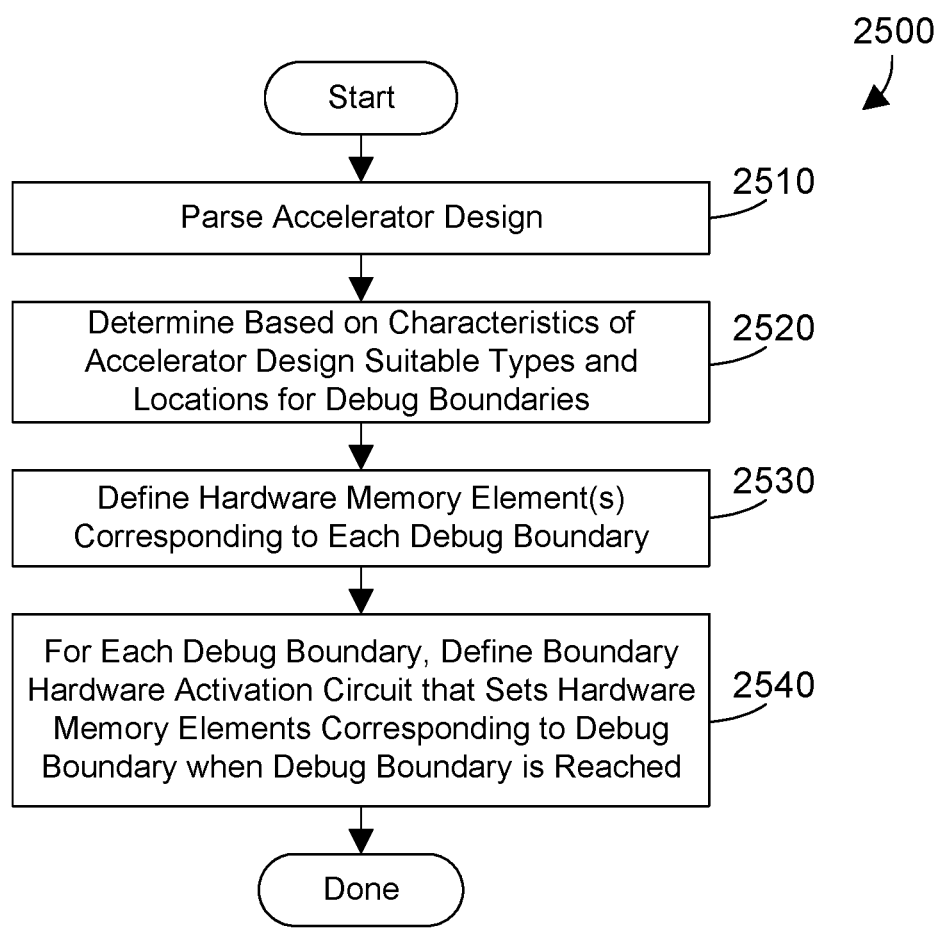
FIG. 25 is a flow diagram of a method for defining debug boundaries in a hardware accelerator design.

Referring to FIG. 25, a method 2500 is preferably performed by the debug boundary tool 2428 in FIG. 24 or the debug boundary tool 331 in FIGS. 3 and 4. The accelerator design is parsed (step 2510). Based on the characteristics of the accelerator design, suitable types and locations for debug boundaries are determined (step 2520). This can include any suitable number of debug boundaries, from two or three, up to hundreds or thousands of debug boundaries. In addition, the type of debug boundary could vary. For example, some debug boundaries could use a latch as a memory element. Other debug boundaries could use one or more memory locations as a memory element. Characteristics of the accelerator design that determine locations where debug boundaries are defined in step 2520 include portions of the design that perform sequential processing. Thus, if a first portion A performs processing in the hardware accelerator, and the result is passed to a second portion B, a debug boundary could be defined between portions A and B. Other characteristics of the accelerator design where debug boundaries could be defined in step 2520 include regions where a large number of signals are reduced to a much smaller number of signals; regions between good/tested logic and experimental logic; regions where logic forks or joins; regions before data is transported on interfaces; regions where data is stored to memory; etc. Of course, any suitable characteristics of the accelerator design could be used to define suitable types and locations for debug boundaries in step 2520.

Once the debug boundaries are defined in step 2520, one or more hardware memory elements are defined that correspond to each debug boundary (step 2530). This could be as simple as a single latch for a debug boundary that is cleared when the accelerator is started, and is then set when the debug boundary is reached. In the alternative, the one or more hardware memory elements defined in step 2530 could include one or more memory locations of any suitable size that allows communicating not only whether the debug boundary was reached, but could include other information, such as which portion of the accelerator design reached the debug boundary, a time stamp, state of any suitable portion of the accelerator design when the debug boundary was reached, user-defined debug information stored when each debug boundary is reached, internal state machine values, values of signals on both sides of the debug boundary, etc. The hardware memory elements defined in step 2530 can include any suitable hardware that can be in a first state before the debug boundary is reached, and can be set to a second state when the debug boundary is reached. Once the hardware memory elements are defined in step 2530, a boundary hardware activation circuit is defined for each debug boundary that sets the hardware memory elements corresponding to the debug boundary when the debug boundary is reached (step 2540). Method 2500 is then done. Once method 2500 has been completed, all of the debug boundaries with their corresponding hardware memory element(s) and hardware activation circuits have been defined in the design of the hardware accelerator.

Figure 26:
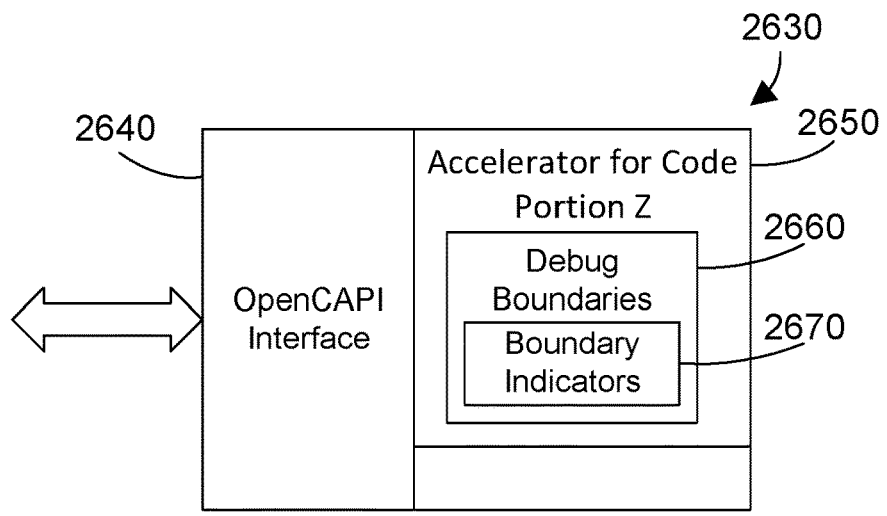
FIG. 26 is a block diagram of a sample accelerator that includes debug boundaries that each includes one or more boundary indicators.

A simple example is now presented to illustrate some of the concepts discussed above. FIG. 26 shows a sample programmable device 2630 that includes an OpenCAPI interface 2640 and an accelerator for a code portion Z 2650. The accelerator for code portion Z 2650 includes multiple defined debug boundaries 2660 that each includes a corresponding boundary indicator 2670 to indicate when the boundary is reached as the hardware accelerator executes.

Figure 27:
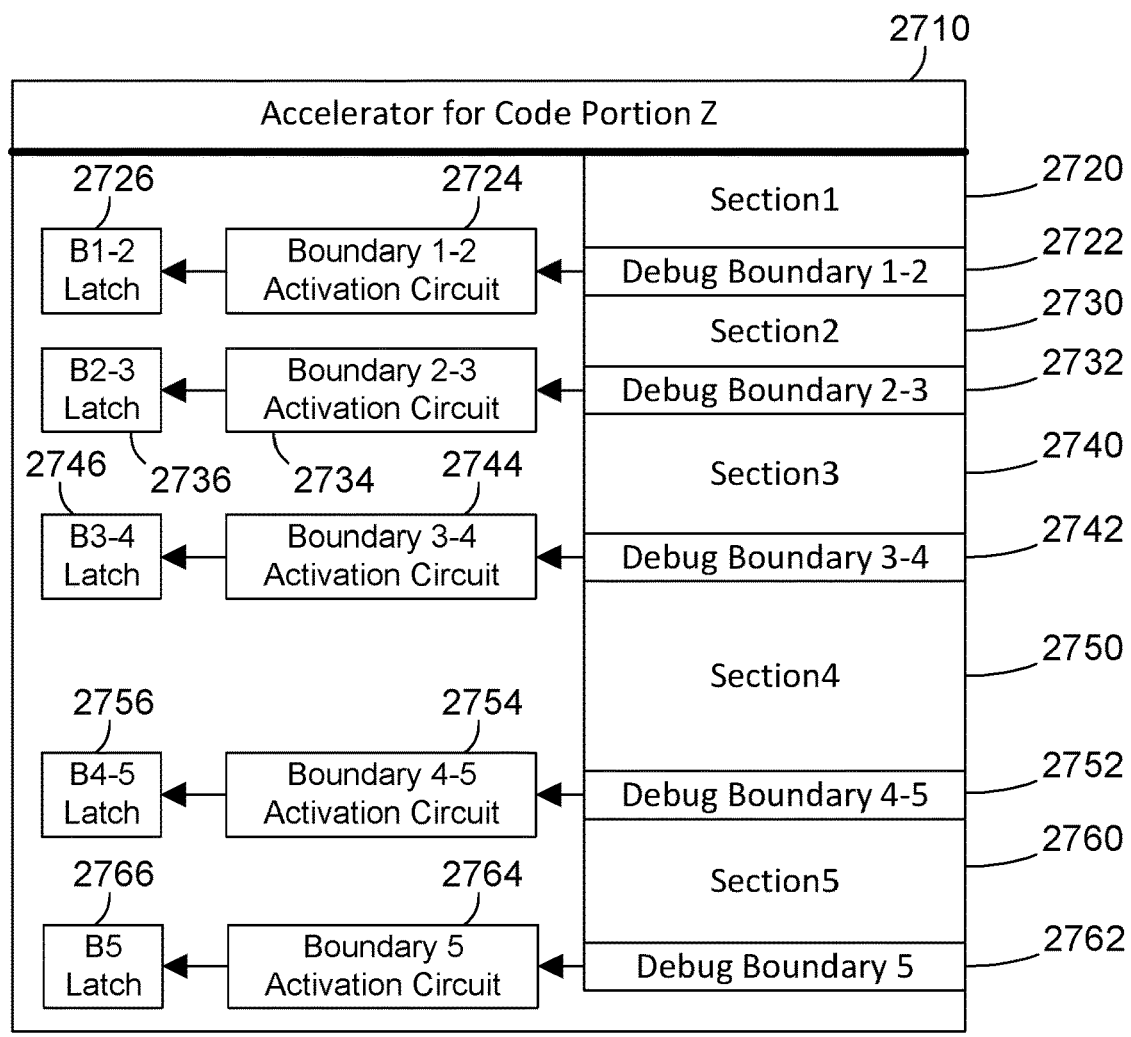
FIG. 27 is a block diagram of possible details of the accelerator for code portion Z showing one possible implementation for the boundary indicators in FIG. 26.

One specific implementation for the accelerator for code portion Z 2650 in FIG. 26 is shown enlarged in FIG. 27 for the purpose of illustration. Accelerator for code portion Z 2710 includes multiple sections that have debug boundaries, as shown on the right portion of FIG. 27. Thus, section1 2720 and section 2 2730 have a debug boundary 2733; section2 2730 and section3 2740 have a debug boundary 2732; section3 2740 and section4 2750 have a debug boundary 2742; section 4 2750 and section5 2760 have a debug boundary 2752; and section5 2760 has a debug boundary 2762 at the end. Each debug boundary has a corresponding boundary activation circuit that sets a corresponding latch to indicate when the debug boundary is reached during execution of the accelerator. We assume for this example the latches are all cleared when the accelerator starts, and are each set when the corresponding boundary is reached. Debug boundary 2722 includes a boundary activation circuit 2724 that sets a corresponding latch 2726; debug boundary 2732 includes a boundary activation circuit 2734 that sets a corresponding latch 2736; debug boundary 2742 includes a boundary activation circuit 2744 that sets a corresponding latch 2746; debug boundary 2752 includes a boundary activation circuit 2754 that sets a corresponding latch 2756; and debug boundary 2762 includes a boundary activation circuit 2764 that sets a corresponding latch 2766.

Figure 28:
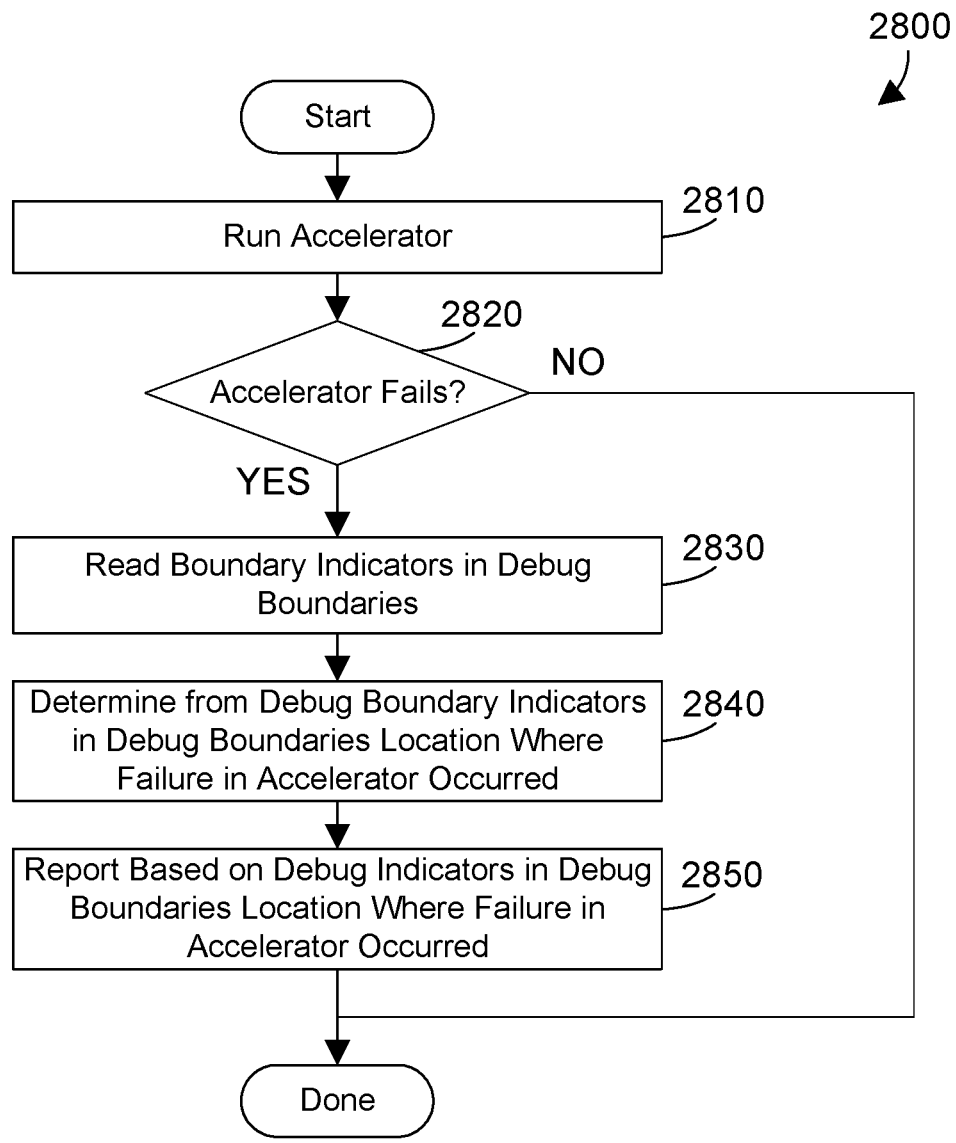
FIG. 28 is a flow diagram of a method for determining a location of a failure in a hardware accelerator using the debug boundaries.

Referring to FIG. 28, a method 2800 could be performed by the accelerator image generator 2427 in FIG. 24, or could be performed by another tool that determines location of a failure using the defined debug boundaries, such as the debug boundary tool. The accelerator is run (step 2810). When the accelerator does not fail (step 2820=NO), method 2800 is done. When the accelerator fails (step 2820=YES), the boundary indicators in the debug boundaries are read (step 2830). The location where the failure in the accelerator occurred is determined from the debug boundary indicators (step 2840). The location where the failure in the accelerator occurred is then reported (step 2850). Method 2800 is then done.

Referring now to FIGS. 27 and 28, the graphical depiction in FIG. 27 allows easily understanding how the debug boundaries help in debugging a hardware accelerator design using method 2800 in FIG. 28. The hardware accelerator for code portion Z 2710 is deployed and run (step 2810).

Initially all the latches 2726, 2736, 2746, 2756 and 2766 are cleared upon initialization of the hardware accelerator 2710. Let's assume for the sake of illustration the hardware accelerator fails during processing in section4 2750 (step 2820=YES). When the latches 2726, 2736, 2746, 2756 and 2766 are read (step 2830), the first three, namely 2726, 2736 and 2746 will be set, indicating their corresponding debug boundaries 2722, 2732 and 2742, respectively, were reached. The last two latches 2756 and 2766 will still be cleared, indicating their corresponding debug boundaries 2752 and 2762 were not reached. This tells us the failure occurred in section4 2750 (step 2840). The location of the failure is then reported (step 2850). The information in the latches thus indicates location of a failure between debug boundaries that allows a user or an automated tool to take appropriate action once the location of the failure is reported.

Figure 29:
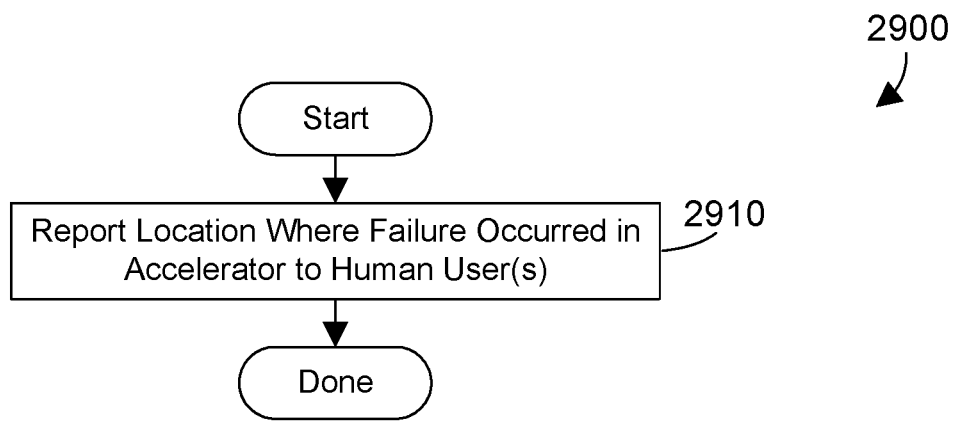
FIG. 29 is a flow diagram showing the reporting of the location of the failure to a human user.

Referring to FIG. 29, a method 2900 is a first suitable example of reporting that could be done during step 2850 in FIG. 28. The location where the failure occurred in the accelerator is reported to one or more human users (step 2910). The user(s) can then take appropriate action to debug the accelerator design now that they have narrowed down where the failure occurred. In other words, the debug boundaries allow focusing the efforts of the user(s) to the section of the design that failed.

Figure 30:
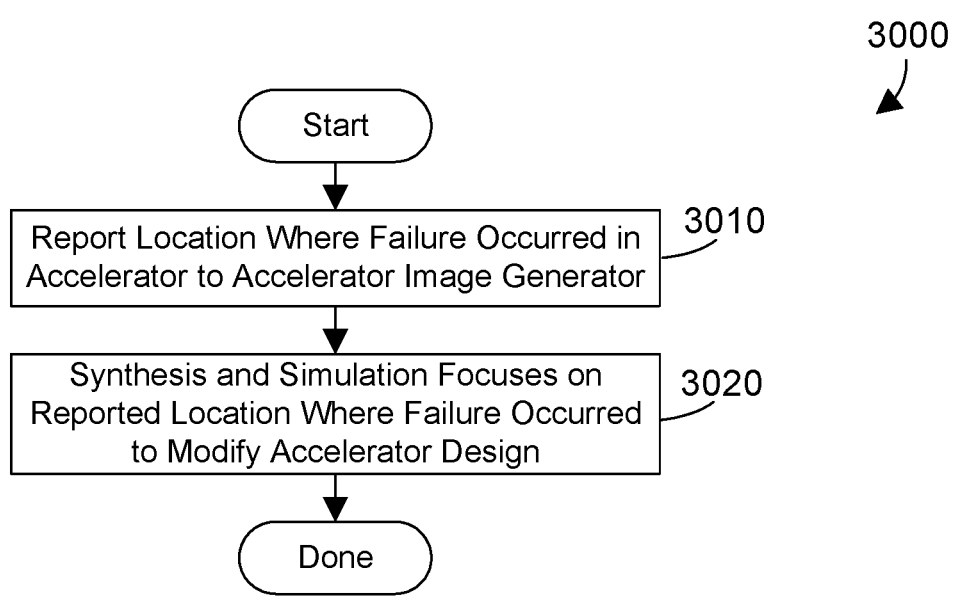
FIG. 30 is a flow diagram of a method that reports the location of the failure to the accelerator image generator, which results in synthesis and/or simulation focusing on the location where the failure occurred.

Referring to FIG. 30, a method 3000 is a second suitable example of reporting that could be done during step 2850 in FIG. 28. The location where the failure occurred in the accelerator is reported to the accelerator image generator (step 3010), such as the accelerator image generator 2427 shown in FIG. 24 or 327 in FIGS. 3 and 4. This allows synthesis and/or simulation to focus on the reported location where the failure occurred to modify the accelerator design (step 3020). Method 3000 is then done.

The debugging of the accelerator design can be done in a progressive and iterative manner using the debug boundaries. For example, section1 2720 in FIG. 27 could be synthesized and/or simulated first, and can then be tested even before the other sections are synthesized and/or simulated. Let's assume, for example, section1 2720 is simulated, then synthesized, with its corresponding debug boundary 2722. Debug of the design will continue until the latch 2726 corresponding to the debug boundary 2722 indicates the boundary 2722 was reached. Section2 2730 can then be added to the accelerator design, and so on. The debug boundaries provide a very simple and modular way to aid in debugging an accelerator by providing information regarding which debug boundaries were reached and which were not.

The number of debug boundaries will determine the granularity of the sections in the accelerator design where a failure could occur. Thus, if an accelerator design has ten debug boundaries that divide the accelerator design into approximate tenths, this means the location of a failure can be pinpointed to within a ten percent section of the accelerator design. If the same accelerator design has one hundred debug boundaries that divide the accelerator design in to approximate hundredths, this means the location of a failure can be pinpointed to within a one percent section of the accelerator design. Of course, sections of different sizes can also be defined using the debug boundaries. The disclosure and claims herein extend to defining any suitable number of debug boundaries between any suitable number of sections in an accelerator design.

The accelerators shown in FIGS. 8, 15, 22 and 26 include an OpenCAPI interface. Note, however, the OpenCAPI interface is not strictly necessary to dynamically generate, deploy and manage accelerators as disclosed herein. Deploying an accelerator to a programmable device that includes an OpenCAPI interface is useful because the Open-CAPI specification is open, allowing anyone to develop to the specification and interoperate in a cloud environment. In addition, the OpenCAPI interface provides lower latency, reducing the "distance" between an accelerator and the data it may consume or produce. Furthermore, OpenCAPI provides higher bandwidth, increasing the amount of data an accelerator can consume or produce in a given time. These advantages of OpenCAPI combine to provide a good environment for implementing a code portion of a computer program in an accelerator, and to lower the threshold for a code portion to be better in an accelerator than in the computer program. However, the disclosure and claims herein apply equally to accelerators that do not include or have access to an OpenCAPI interface.

The disclosure and claims herein support an apparatus comprising: at least one processor; a memory coupled to the at least one processor; an accelerator design for a programmable device, wherein the accelerator design resides in the memory; and a debug boundary tool that defines a plurality of debug boundaries in the accelerator design, wherein each of the plurality of debug boundaries comprises: a hardware memory element; and an activation circuit that sets the hardware memory element when the corresponding debug boundary is reached during execution of the accelerator design in the programmable device.

The disclosure and claims herein further support an apparatus comprising: at least one processor; a memory coupled to the at least one processor; an accelerator design for a field-programmable gate array (FPGA), wherein the accelerator design resides in the memory and comprises an Open Coherent Accelerator Processor Interface (Open-CAPI); a debug boundary tool that defines a plurality of debug boundaries in the accelerator design, wherein each of the plurality of debug boundaries comprises: a hardware memory element; and an activation circuit that sets the hardware memory element when the corresponding debug boundary is reached during execution of the accelerator design in the programmable device; wherein the debug boundary tool parses the accelerator design and determines based on characteristics of the accelerator design types and locations for the plurality of debug boundaries; wherein the debug boundary tool reads the hardware memory elements corresponding to the plurality of debug boundaries after a failure in the executing accelerator design is detected and determines based on the values read a location of the failure, and reports the location of the failure to an accelerator image generator that comprises a synthesis tool for synthesizing circuitry in the accelerator design and a simulation tool for simulating the circuitry in the accelerator design; and wherein the synthesis tool and simulation tool focus on the location of the failure to modify the accelerator design.

The disclosure and claims herein additionally support a method for determining a cause of failure in a hardware accelerator in a programmable device, the method comprising: defining a plurality of debug boundaries in an accelerator design for the hardware accelerator, wherein each of the plurality of debug boundaries comprises: a hardware memory element; and an activation circuit that sets the hardware memory element when the corresponding debug boundary is reached during execution of the accelerator design in the programmable device.

Multiple debug boundaries are defined in a hardware accelerator. The location of debug boundaries can be defined by a human user, or can be determined by automated tools based on characteristics of the circuitry in the hardware accelerator. Each debug boundary includes one or more hardware memory elements that are in a first state to indicate the debug boundary has not yet been reached, and that are changed to a second state by the hardware accelerator to indicate the debug boundary has been reached during execution of the hardware accelerator. Providing multiple debug boundaries in a hardware accelerator aids in debugging the accelerator design by identifying a particular section of the hardware accelerator where the failure occurred. This information regarding location of a failure may be provided to a user or to synthesis and simulation tools for the hardware accelerator design.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   an accelerator design for a programmable device, wherein the accelerator design resides in the memory; and
   a debug boundary tool that defines a plurality of debug boundaries in the accelerator design, wherein each of the plurality of debug boundaries comprises:
      a hardware memory element; and
      an activation circuit that sets the hardware memory element when the corresponding debug boundary is reached during execution of the accelerator design in the programmable device.

2. The apparatus of claim 1 wherein the accelerator design comprises an Open Coherent Accelerator Processor Interface (OpenCAPI).

3. The apparatus of claim 1 wherein the programmable device comprises a field-programmable gate array (FPGA).

4. The apparatus of claim 1 wherein a user uses the debug boundary tool to define the plurality of debug boundaries at locations in the accelerator design selected by the user.

5. The apparatus of claim 1 wherein the debug boundary tool parses the accelerator design and determines based on characteristics of the accelerator design locations for the plurality of debug boundaries.

6. The apparatus of claim 5 wherein the debug boundary tool further determines types for the plurality of debug boundaries based on the characteristics of the accelerator design.

7. The apparatus of claim 1 wherein the debug boundary tool reads the hardware memory elements corresponding to the plurality of debug boundaries after a failure in the executing accelerator design is detected.

8. The apparatus of claim 7 wherein the debug boundary tool analyzes the values read from the hardware memory elements corresponding to the plurality of debug boundaries and determines based on the values read a location of the failure.

9. The apparatus of claim 8 wherein the debug boundary tools reports the location of the failure to an accelerator image generator that comprises a synthesis tool for synthesizing circuitry in the accelerator design and a simulation tool for simulating the circuitry in the accelerator design.

10. An apparatus comprising:
    at least one processor;
    a memory coupled to the at least one processor;
    an accelerator design for a field-programmable gate array (FPGA), wherein the accelerator design resides in the memory and comprises an Open Coherent Accelerator Processor Interface (OpenCAPI);
    a debug boundary tool that defines a plurality of debug boundaries in the accelerator design, wherein each of the plurality of debug boundaries comprises:
       a hardware memory element; and
       an activation circuit that sets the hardware memory element when the corresponding debug boundary is reached during execution of the accelerator design in the programmable device;
    wherein the debug boundary tool parses the accelerator design and determines based on characteristics of the accelerator design types and locations for the plurality of debug boundaries;
    wherein the debug boundary tool reads the hardware memory elements corresponding to the plurality of debug boundaries after a failure in the executing accelerator design is detected and determines based on the values read a location of the failure, and reports the location of the failure to an accelerator image generator that comprises a synthesis tool for synthesizing circuitry in the accelerator design and a simulation tool for simulating the circuitry in the accelerator design; and
    wherein the synthesis tool and simulation tool focus on the location of the failure to modify the accelerator design.

11. A method for determining a cause of failure in a hardware accelerator in a programmable device, the method comprising:
    defining a plurality of debug boundaries in an accelerator design for the hardware accelerator, wherein each of the plurality of debug boundaries comprises:
       a hardware memory element; and
       an activation circuit that sets the hardware memory element when the corresponding debug boundary is reached during execution of the accelerator design in the programmable device.

12. The method of claim 11 wherein the accelerator design comprises an Open Coherent Accelerator Processor Interface (OpenCAPI).

13. The method of claim 11 wherein the programmable device comprises a field-programmable gate array (FPGA).

14. The method of claim 11 wherein a user uses the debug boundary tool to define the plurality of debug boundaries at locations in the accelerator design selected by the user.

15. The method of claim 11 wherein the debug boundary tool parses the accelerator design and determines based on characteristics of the accelerator design locations for the plurality of debug boundaries.

16. The method of claim 15 wherein the debug boundary tool further determines types for the plurality of debug boundaries based on the characteristics of the accelerator design.

17. The method of claim 11 wherein the debug boundary tool reads the hardware memory elements corresponding to the plurality of debug boundaries after a failure in the executing accelerator design is detected.

18. The method of claim 17 wherein the debug boundary tool analyzes the values read from the hardware memory elements corresponding to the plurality of debug boundaries and determines based on the values read a location of the failure.

19. The method of claim 18 wherein the debug boundary tools reports the location of the failure to an accelerator image generator that comprises a synthesis tool for synthesizing circuitry in the accelerator design and a simulation tool for simulating the circuitry in the accelerator design.

* * * * *